US008812309B2

(12) United States Patent
Ramakrishnan et al.

(10) Patent No.: US 8,812,309 B2
(45) Date of Patent: Aug. 19, 2014

(54) METHODS AND APPARATUS FOR SUPPRESSING AMBIENT NOISE USING MULTIPLE AUDIO SIGNALS

(75) Inventors: Dinesh Ramakrishnan, San Diego, CA (US); Song Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 792 days.

(21) Appl. No.: 12/323,200

(22) Filed: Nov. 25, 2008

(65) Prior Publication Data

US 2009/0240495 A1 Sep. 24, 2009

Related U.S. Application Data

(60) Provisional application No. 61/037,453, filed on Mar. 18, 2008.

(51) Int. Cl.
*G10L 21/02* (2013.01)
*G10L 21/00* (2013.01)
*G10K 11/00* (2006.01)
*H04B 15/00* (2006.01)
*H04R 25/00* (2006.01)

(52) U.S. Cl.
USPC ............. 704/226; 704/200; 381/10; 381/317; 381/71.1; 381/94.7

(58) Field of Classification Search
USPC ......... 704/200–201, 211–218, 225, 226–228, 704/270–271, 278, E17.001–E17.016, 704/E19.001–E19.049, E21.001–E21.02; 381/1–28, 55–60, 312–331, 71.1–71.4, 381/92–96, 104–109
See application file for complete search history.

(56) References Cited

U.S. PATENT DOCUMENTS 5,511,128 A * 4/1996 Lindemann ..................... 381/92
6,002,776 A * 12/1999 Bhadkamkar et al. .......... 381/66
6,154,552 A * 11/2000 Koroljow et al. ............. 381/313
6,594,367 B1 * 7/2003 Marash et al. .................. 381/92
7,099,821 B2 * 8/2006 Visser et al. .................. 704/226
7,130,429 B1 10/2006 Dalgaard et al.

(Continued)

FOREIGN PATENT DOCUMENTS

JP 10207490 A 8/1998
JP 11052977 A 2/1999

(Continued)

OTHER PUBLICATIONS

Peng, et al. "Asymmetric Crosstalk-Resistant Adaptive Noise Canceller and Its Application in Beamforming." Circuits and Systems, 1992. ISCAS '92. Proceedings., 1992 IEEE International Symposium on, vol. 2, pp. 513-516. May 1992.*

(Continued)

*Primary Examiner* — Pierre-Louis Desir
*Assistant Examiner* — David Kovacek
(74) *Attorney, Agent, or Firm* — Espartaco Diaz Hidalgo

(57) ABSTRACT

A method for suppressing ambient noise using multiple audio signals may include providing at least two audio signals captured by at least two electro-acoustic transducers. The at least two audio signals may include desired audio and ambient noise. The method may also include performing beamforming on the at least two audio signals in order to obtain a desired audio reference signal that is separate from a noise reference signal.

36 Claims, 23 Drawing Sheets

(56) References Cited

U.S. PATENT DOCUMENTS

| | | | | |
|---|---|---|---|---|
| 7,366,662 | B2 * | 4/2008 | Visser et al. | 704/227 |
| 7,587,054 | B2 * | 9/2009 | Elko et al. | 381/92 |
| 8,068,619 | B2 * | 11/2011 | Zhang et al. | 381/92 |
| 8,103,023 | B2 * | 1/2012 | Merks | 381/150 |
| 8,184,816 | B2 | 5/2012 | Ramakrishnan et al. | |
| 8,379,875 | B2 * | 2/2013 | Hamalainen | 381/92 |
| 2002/0048376 | A1 * | 4/2002 | Ukita | 381/92 |
| 2003/0027600 | A1 | 2/2003 | Krasny et al. | |
| 2003/0147538 | A1 * | 8/2003 | Elko | 381/92 |
| 2003/0161485 | A1 * | 8/2003 | Smith | 381/92 |
| 2004/0008850 | A1 | 1/2004 | Gustavsson | |
| 2004/0161120 | A1 | 8/2004 | Petersen et al. | |
| 2005/0047611 | A1 * | 3/2005 | Mao | 381/94.7 |
| 2005/0123149 | A1 * | 6/2005 | Elko et al. | 381/92 |
| 2005/0141731 | A1 * | 6/2005 | Hamalainen | 381/94.3 |
| 2005/0147258 | A1 * | 7/2005 | Myllyla et al. | 381/71.11 |
| 2005/0149320 | A1 | 7/2005 | Kajala et al. | |
| 2005/0195988 | A1 * | 9/2005 | Tashev et al. | 381/92 |
| 2006/0120540 | A1 * | 6/2006 | Luo | 381/98 |
| 2006/0153360 | A1 * | 7/2006 | Kellermann et al. | 379/406.08 |
| 2006/0222184 | A1 * | 10/2006 | Buck et al. | 381/71.1 |
| 2006/0269080 | A1 * | 11/2006 | Oxford et al. | 381/92 |
| 2007/0047743 | A1 * | 3/2007 | Taenzer et al. | 381/92 |
| 2007/0076898 | A1 * | 4/2007 | Sarroukh et al. | 381/92 |
| 2007/0088544 | A1 * | 4/2007 | Acero et al. | 704/226 |
| 2007/0274534 | A1 * | 11/2007 | Lockhart et al. | 381/92 |
| 2008/0192955 | A1 * | 8/2008 | Merks | 381/92 |
| 2008/0317259 | A1 * | 12/2008 | Zhang et al. | 381/92 |
| 2009/0089053 | A1 * | 4/2009 | Wang et al. | 704/233 |
| 2009/0190774 | A1 * | 7/2009 | Wang et al. | 381/92 |
| 2009/0238377 | A1 * | 9/2009 | Ramakrishnan et al. | 381/92 |
| 2009/0240495 | A1 * | 9/2009 | Ramakrishnan et al. | 704/226 |
| 2009/0304203 | A1 * | 12/2009 | Haykin et al. | 381/94.1 |

FOREIGN PATENT DOCUMENTS

| | | | |
|---|---|---|---|
| JP | 11231900 | A | 8/1999 |
| JP | 2005195955 | A | 7/2005 |
| JP | 2008219458 | A | 9/2008 |
| TW | 289477 | | 10/1996 |
| TW | 589802 | B | 6/2004 |
| TW | 1244819 | B | 12/2005 |
| TW | 200828264 | A | 7/2008 |
| WO | WO2004008804 | | 1/2004 |
| WO | 2007028250 | A2 | 3/2007 |
| WO | 2007144147 | A1 | 12/2007 |
| WO | WO2008037925 | A1 | 4/2008 |
| WO | WO2008101198 | A2 | 8/2008 |

OTHER PUBLICATIONS

Cohen I et al: "Two-channel signal detection and speech enhancement based on the transient beam-to-reference ratio " Proceedings of International Conference on Acoustics, Speech and Signal Processing (ICASSP'03) Apr. 6-10, 2003 Hong Kong, China; [IEEE International Conference on Acoustics, Speech, and Signal Processing ( ICASSP ), 2003 IEEE International Conference, vol. 5, Apr. 6, 2003, pp. V_233-V_236, XP010639251.

Fa-Long Luo and Arye Nehorai,"Recent developments in signal processing for digital hearing aids," IEEE Signal Processing Magazine, pp. 103-106, Sep. 2006.

International Search Report—PCT/US2009/065761, International Search Authority—European Patent Office—Mar. 5, 2010.

Michael R. Shust, "Active removal of wind noise from outdoor microphones using local velocity measurements," PhD dissertation, Michigan Technological University, Jul. 1998.

Written Opinion—PCT/US2009/065761—ISA/EPO—Mar. 5, 2010.

Taiwan Search Report—TW098140186—TIPO—Jun. 12, 2013.

* cited by examiner

METHODS AND APPARATUS FOR SUPPRESSING AMBIENT NOISE USING MULTIPLE AUDIO SIGNALS

RELATED APPLICATIONS

This application is related to and claims priority from U.S. Provisional Patent Application Ser. No. 61/037,453, filed Mar. 18, 2008, for "Wind Gush Detection Using Multiple Microphones," with inventors Dinesh Ramakrishnan and Song Wang, which is incorporated herein by reference.

TECHNICAL FIELD

The present disclosure relates generally to signal processing. More specifically, the present disclosure relates to suppressing ambient noise using multiple audio signals recorded using electro-transducers such as microphones.

BACKGROUND

Communication technologies continue to advance in many areas. As these technologies advance, users have more flexibility in the ways they may communicate with one another. For telephone calls, users may engage in direct two-way calls or conference calls. In addition, headsets or speakerphones may be used to enable hands-free operation. Calls may take place using standard telephones, cellular telephones, computing devices, etc.

This increased flexibility enabled by advancing communication technologies also makes it possible for users to make calls from many different kinds of environments. In some environments, various conditions may arise that can affect the call. One condition is ambient noise.

Ambient noise may degrade transmitted audio quality. In particular, it may degrade transmitted speech quality. Hence, benefits may be realized by providing improved methods and apparatus for suppressing ambient noise.

DETAILED DESCRIPTION

Figure 1:
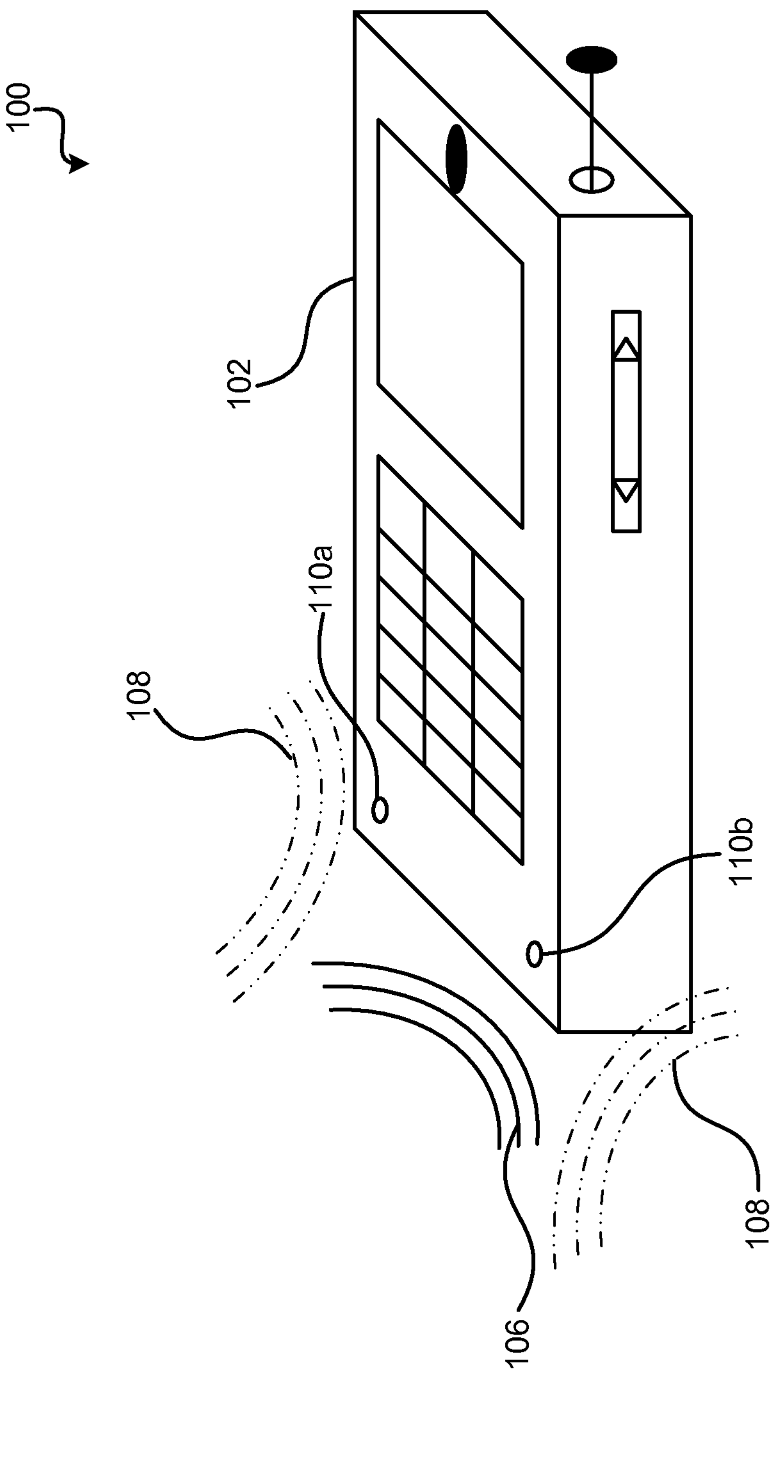
FIG. 1 is an illustration of a wireless communications device and an example showing how voice audio and ambient noise may be received by the wireless communication device.

A method for suppressing ambient noise using multiple audio signals is disclosed. The method may include providing at least two audio signals by at least two electro-acoustic transducers. The at least two audio signals may include desired audio and ambient noise. The method may also include performing beamforming on the at least two audio signals in order to obtain a desired audio reference signal that is separate from a noise reference signal. The method may also include refining the noise reference signal by removing residual desired audio from the noise reference signal, thereby obtaining a refined noise reference signal.

An apparatus for suppressing ambient noise using multiple audio signals is disclosed. The apparatus may include at least two electro-acoustic transducers that provide at least two audio signals comprising desired audio and ambient noise. The apparatus may also include a beamformer that performs beamforming on the at least two audio signals in order to obtain a desired audio reference signal that is separate from a noise reference signal. The apparatus may also include a noise reference refiner that refines the noise reference signal by removing residual desired audio from the noise reference signal, thereby obtaining a refined noise reference signal.

An apparatus for suppressing ambient noise using multiple audio signals is disclosed. The apparatus may include means for providing at least two audio signals by at least two electro-acoustic transducers. The at least two audio signals comprise desired audio and ambient noise. The apparatus may also include means for performing beamforming on the at least two audio signals in order to obtain a desired audio reference signal that is separate from a noise reference signal. The apparatus may further include means for refining the noise reference signal by removing residual desired audio from the noise reference signal, thereby obtaining a refined noise reference signal.

A computer-program product for suppressing ambient noise using multiple audio signals is disclosed. The computer-program product may include a computer-readable medium having instructions thereon. The instructions may include code for providing at least two audio signals by at least two electro-acoustic transducers. The at least two audio signals may include desired audio and ambient noise. The instructions may also include code for performing beamforming on the at least two audio signals in order to obtain a desired audio reference signal that is separate from a noise reference signal. The instructions may also include code for refining the noise reference signal by removing residual desired audio from the noise reference signal, thereby obtaining a refined noise reference signal.

Mobile communication devices increasingly employ multiple microphones to improve transmitted voice quality in noisy scenarios. Multiple microphones may provide the capability to discriminate between desired voice and background noise and thus help improve the voice quality by suppressing background noise in the audio signal. Discrimination of voice from noise may be particularly difficult if the microphones are placed close to each other on the same side of the device. Methods and apparatus are presented for separating desired voice from noise in these scenarios.

Voice quality is a major concern in mobile communication systems. Voice quality is highly affected by the presence of ambient noise during the usage of a mobile communication device. One solution for improving voice quality during noisy scenarios may be to equip the mobile device with multiple microphones and use sophisticated signal processing techniques to separate the desired voice from ambient noise. Particularly, mobile devices may employ two microphones for suppressing the background noise and improving voice quality. The two microphones may often be placed relatively far apart. For example, one microphone may be placed on the front side of the device and another microphone may be placed on the back side of the device, in order to exploit the diversity of acoustic reception and provide for better discrimination of desired voice and background noise. However, for the ease of manufacturability and consumer usage, it may be beneficial to place the two microphones close to each other on the same side of the device. Many of the commonly available signal processing solutions are incapable of handling this closely spaced microphone configuration and do not provide good discrimination of desired voice and ambient noise. Hence, new methods and apparatus for improving the voice quality of a mobile communication device employing multiple microphones are disclosed. The proposed approach may be applicable to a wide variety of closely spaced microphone configurations (typically less than 5 cm). However, it is not limited to any particular value of microphone spacing.

Two closely spaced microphones on a mobile device may be exploited to improve the quality of transmitted voice. In particular, beamforming techniques may be used to discriminate desired audio (e.g., speech) from ambient noise and improve the audio quality by suppressing ambient noise. Beamforming may separate the desired audio from ambient noise by forming a beam towards the desired speaker. It may also separate ambient noise from the desired audio by forming a null beam in the direction of the desired audio. The beamformer output may or may not be post-processed in order to further improve the quality of the audio output.

FIG. 1 is an illustration of a wireless communications device 102 and an example showing how desired audio (e.g., speech 106) and ambient noise 108 may be received by the wireless communication device 102. A wireless communications device 102 may be used in an environment that may include ambient noise 108. Hence, the ambient noise 108 in addition to speech 106 may be received by microphones 110*a*, 110*b* which may be housed in a wireless communications device 102. The ambient noise 108 may degrade the quality of the speech 106 as transmitted by the wireless communications device 102. Hence, benefits can be realized via methods and apparatus capable of separating and suppressing the ambient noise 108 from the speech 106. Although this example is given, the methods and apparatus disclosed herein can be utilized in any number of configurations. For example, the methods and apparatus disclosed herein may be configured for use in a mobile phone, "land line" phone, wired headset, wireless headset (e.g. Bluetooth®), hearing aid, audio/video recording device, and virtually any other device that utilizes transducers/microphones for receiving audio.

Figure 2A:
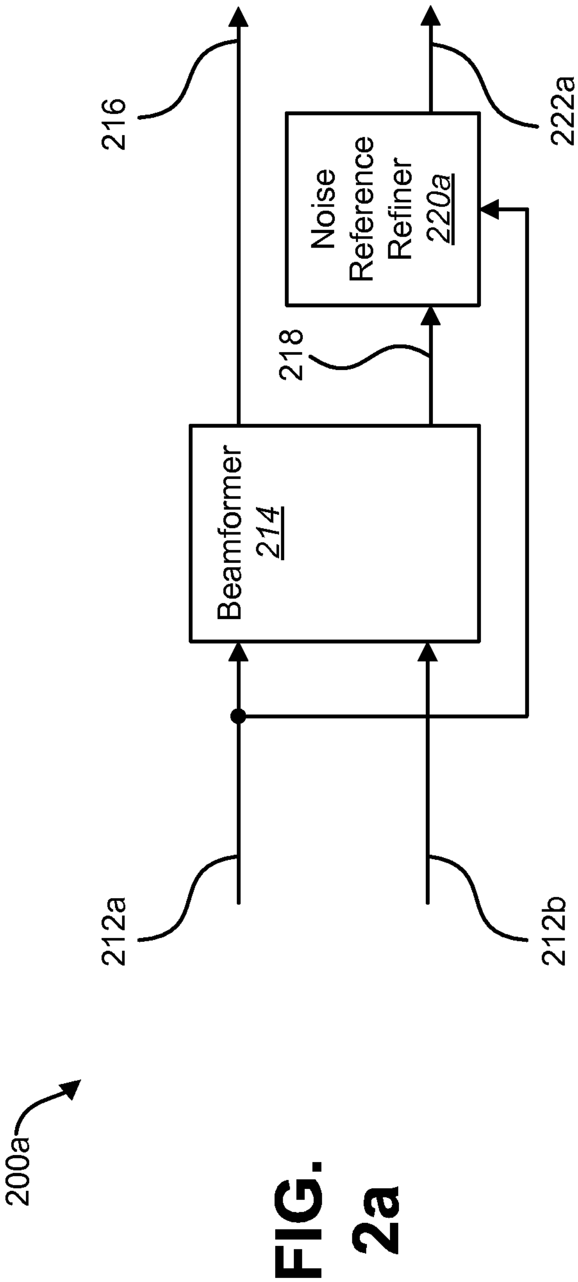
FIG. 2*a* is a block diagram illustrating some aspects of one possible configuration of a system including ambient noise suppression.

FIG. 2*a* is a block diagram illustrating some aspects of one possible configuration of a system 200*a* including ambient noise suppression. The system 200*a* may include a beamformer 214 and/or a noise reference refiner 220*a*. The system 200*a* may be configured to receive digital audio signals 212*a*, 212*b*. The digital audio signals 212*a*, 212*b* may or may not have matching or similar energy levels. The digital audio signals 212*a*, 212*b*, may be signals from two audio sources (e.g., the microphones 110*a*, 110*b* in the device 102 shown in FIG. 1).

The digital audio signals 212*a*, 212*b*, may have matching or similar signal characteristics. For example, both signals 212*a*, 212*b* may include a desired audio signal (e.g., speech 106). The digital audio signals 212*a*, 212*b* may also include ambient noise 108.

The digital audio signals 212*a*, 212*b* may be received by a beamformer 214. One of the digital audio signals 212*a* may also be routed to a noise reference refiner 220*a*. The beamformer 214 may generate a desired audio reference signal 216 (e.g., a voice/speech reference signal). The beamformer 214 may generate a noise reference signal 218. The noise reference signal 218 may contain residual desired audio. The noise reference refiner 220*a* may reduce or effectively eliminate the residual desired audio from the noise reference signal 218 in order to generate a refined noise reference signal 222*a*. The noise reference refiner 220*a* may utilize one of the digital audio signals 212*a* to generate a refined noise reference signal 222*a*. The desired audio reference signal 216 and the refined noise reference signal 222*a* may be utilized to improve desired audio output. For example, the refined noise reference signal 222*a* may be filtered and subtracted from the desired audio reference signal 216 in order to reduce noise in the desired audio. The refined noise reference signal 222*a* and the desired audio reference signal 216 may also be further processed to reduce noise in the desired audio.

Figure 2B:
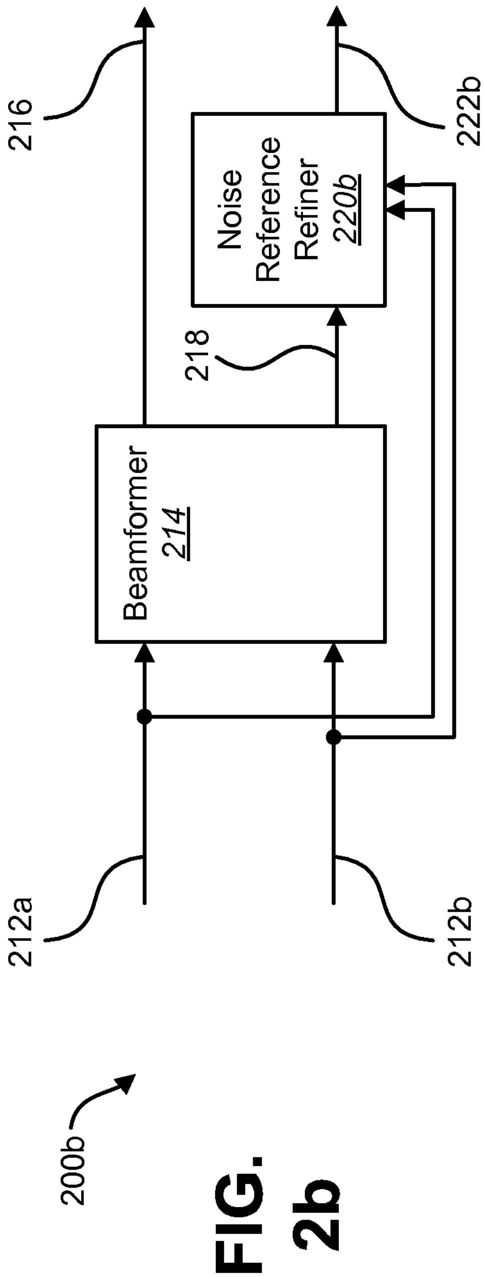
FIG. 2*b* is a block diagram illustrating some aspects of another possible configuration of a system including ambient noise suppression.

FIG. 2*b* is another block diagram illustrating some aspects of another possible configuration of a system 200*b* including ambient noise suppression. The system 200*b* may include digital audio signals 212*a*, 212*b*, a beamformer 214, a desired audio reference signal 216, a noise reference signal 218, a noise reference refiner 220*b*, and a refined noise reference signal 222*b*. As the noise reference signal 218 may include residual desired audio, the noise reference refiner 220$b$ may reduce or effectively eliminate residual desired audio from the noise reference signal 218. The noise reference refiner 220$b$ may utilize both digital audio signals 212$a$, 212$b$ in addition to the noise reference signal 218 in order to generate a refined noise reference signal 222$b$. The refined noise reference signal 222$b$ and the desired audio reference signal 216 may be utilized in order to improve the desired audio.

FIG. 3$a$ is a block diagram illustrating some aspects of one possible configuration of a beamformer 314$a$. The primary purpose of the beamformer 314$a$ may be to process digital audio signals 312$a$, 312$b$ and generate a desired audio reference signal 316$a$ and a noise reference signal 318$a$. The noise reference signal 318$a$ may be generated by forming a null beam towards the desired audio source (e.g., the user) and suppressing the desired audio (e.g., the speech 106) from the digital audio signals 312$a$, 312$b$. The desired audio reference signal 316$a$ may be generated by forming a beam towards the desired audio source and suppressing ambient noise 108 coming from other directions. The beamforming process may be performed through fixed beamforming and/or adaptive beamforming. FIG. 3$a$ illustrates a configuration 300$a$ utilizing a fixed beamforming approach.

The beamformer 314$a$ may be configured to receive the digital audio signals 312$a$, 312$b$. The digital audio signals 312$a$, 312$b$ may or may not be calibrated such that their energy levels are matched or similar. The digital audio signals 312$a$, 312$b$ may be designated $z_{c1}(n)$ and $z_{c2}(n)$ respectively, where n is the digital audio sample number. A simple form of fixed beamforming may be referred to as "broadside" beamforming. The desired audio reference signal 316$a$ may be designated $z_{b1}(n)$. For fixed "broadside" beamforming, the desired audio reference signal 316$a$ may be given by equation (1):

$$z_{b1}(n)=z_{c1}(n)+z_{c2}(n) \quad (1)$$

The noise reference signal 318$a$ may be designated $z_{b2}(n)$. The noise reference signal 318$a$ may be given by equation (2):

$$z_{b2}(n)=z_{c1}(n)-z_{c2}(n) \quad (2)$$

In accordance with broadside beamforming, it is assumed that the desired audio source is equidistant to the two microphones (e.g., microphones 110$a$, 110$b$). If the desired audio source is closer to one microphone than the other, the desired audio signal captured by one microphone will suffer a time delay compared to the desired audio signal captured by the other microphone. In this case, the performance of the fixed beamformer can be improved by compensating for the time delay difference between the two microphone signals. Hence, the beamformer 314$a$ may include a delay compensation filter 324. The desired audio reference signal 316$a$ and the noise reference signal 318$a$ may be expressed in equations (3) and (4), respectively.

$$z_{b1}(n)=z_{c1}(n)+z_{c2}(n-\tau) \quad (3)$$

$$z_{b2}(n)=z_{c1}(n)-z_{c2}(n-\tau) \quad (4)$$

Here, $\tau$ may denote the time delay between the digital audio signals 312$a$, 312$b$ captured by the two microphones and may take either positive or negative values. The time delay difference between the two microphone signals may be calculated using any of the methods of time delay computation known in the art. The accuracy of time delay estimation methods may be improved by computing the time delay estimates only during desired audio activity periods.

The time delay $\tau$ may also take fractional values if the microphones are very closely spaced (e.g., less than 4 cm). In this case, fractional time delay estimation techniques may be used to calculate $\tau$. Fractional time delay compensation may be performed using a sinc filtering method. In this method, the calibrated microphone signal is convolved with a delayed sinc signal to perform fractional time delay compensation as shown in equation (5):

$$z_{c2}(n-\tau)=z_{c2}(n)*\mathrm{sinc}(n-\tau) \quad (5)$$

A simple procedure for computing fractional time delay may involve searching for the value $\tau$ that maximizes the cross-correlation between the first digital audio signal 312$a$ (e.g., $z_{c1}(n)$) and the time delay compensated second digital audio signal 312$b$ (e.g., $z_{c2}(n)$) as shown in equation (6):

$$\tau(k) = \underset{\tau}{\operatorname{argmax}} \left| \sum_{n=(k-1)N}^{kN} z_{c1}(n) z_{c2}(n-\tau) \right| \quad (6)$$

Here, the digital audio signals 312$a$, 312$b$ may be segmented into frames where N is the number of samples per frame and k is the frame number. The cross-correlation between the digital audio signals 312$a$, 312$b$ (e.g., $z_{c1}(n)$ and $z_{c2}(n)$) may be computed for a variety of values of $\tau$. The time delay value for $\tau$ may be computed by finding the value of $\tau$ that maximizes the cross-correlation. This procedure may provide good results when the Signal-to-Noise Ratio (SNR) of the digital audio signals 312$a$, 312$b$ is high.

FIG. 3$b$ is a block diagram illustrating some aspects of another possible configuration of a beamformer 314$b$. The fixed beamforming procedure (as shown in FIG. 3$a$) assumes that the frequency responses of the two microphones are well matched. There may be slight differences, however, between the frequency responses of the two microphones. The beamformer 314$b$ may utilize adaptive beamforming techniques. In this procedure, an adaptive filter 326 may be used to match the second digital audio signal 312$b$ with the first digital audio signal 312$a$. That is, the adaptive filter 326 may match the frequency responses of the two microphones, as well as compensate for any delay between the digital audio signals 312$a$, 312$b$. The second digital audio signal 312$b$ may be used as the input to the adaptive filter 326, while the first digital audio signal 312$a$ may be used as the reference to the adaptive filter 326. The filtered audio signal 328 may be designated $z_{w2}(n)$. The noise reference (or "beamformed") signal 318$b$ may be designated $z_{b2}(n)$. The weights for the adaptive filter 326 may be designated $w_1(i)$, where i is a number between zero and M−1, M being the length of the filter. The adaptive filtering process may be expressed as shown in equations (7) and (8):

$$z_{w2}(n) = \sum_{i=0}^{M-1} w_1(i) z_{c2}(n-i) \quad (7)$$

$$z_{b2}(n) = z_{c1}(n) - z_{w2}(n) \quad (8)$$

The adaptive filter weights $w_1(i)$ may be adapted using any standard adaptive filtering algorithm such as Least Mean Squared (LMS) or Normalized LMS (NLMS), etc. The desired audio reference signal 316$b$ (e.g., $z_{b1}(n)$) and the noise reference signal 318$b$ (e.g., $z_{b2}(n)$) may be expressed as shown in equations (9) and (10):

$$z_{b1}(n)=z_{c1}(n)+z_{w2}(n) \quad (9)$$

$$z_{b2}(n)=z_{c1}(n)-z_{w2}(n) \quad (10)$$

Figure 3A:
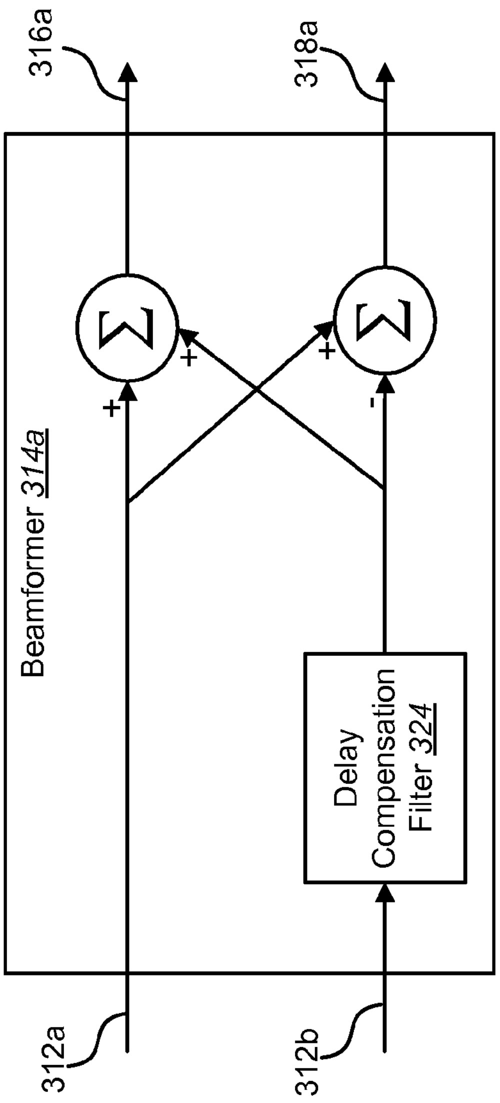
FIG. 3*a* is a block diagram illustrating some aspects of one possible configuration of a beamformer.
Figure 3B:
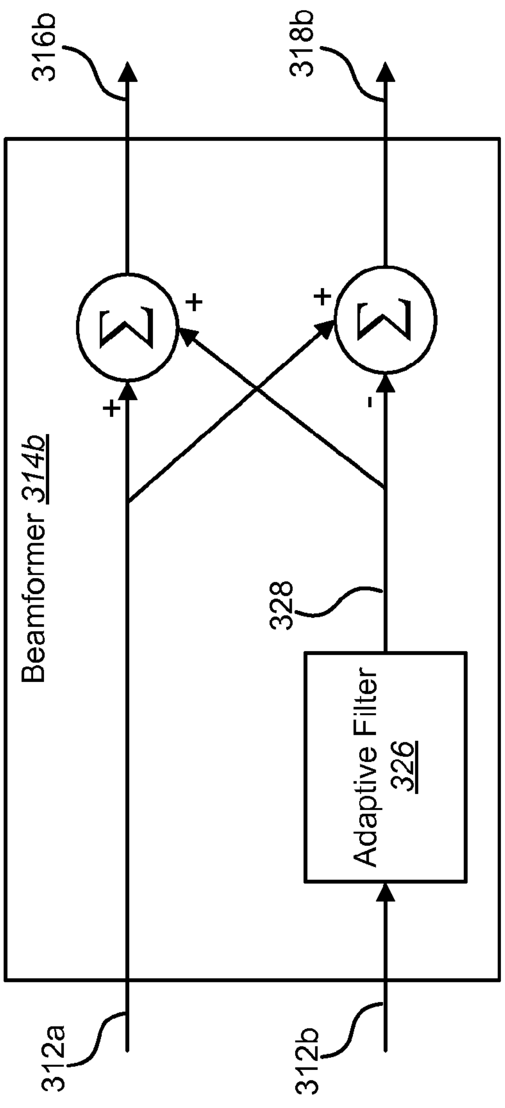
FIG. 3*b* is a block diagram illustrating some aspects of another possible configuration of a beamformer.

The adaptive beamforming procedure shown in FIG. 3*b* may remove more desired audio from the second digital audio signal 312*b* and may produce a better noise reference signal 318*b* than the fixed beamforming technique shown in FIG. 3*a*.

Figure 3C:
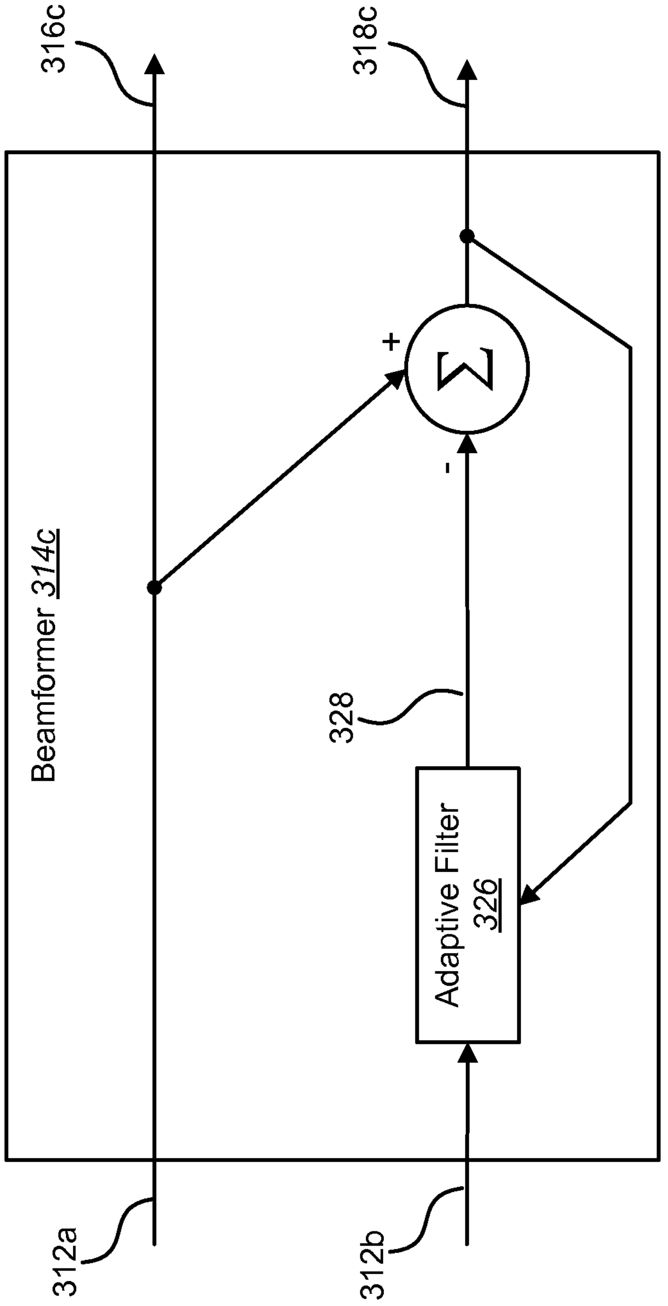
FIG. 3*c* is a block diagram illustrating some aspects of another possible configuration of a beamformer.

FIG. 3*c* is a block diagram illustrating some aspects of another possible configuration of a beamformer 314*c*. The beamformer 314*c* may be applied only for the generation of a noise reference signal 318*c* and the first digital audio signal 312*a* may be simply used as the desired audio reference signal 316*c* (e.g., $z_{b1}(n)=z_{c1}(n)$). In certain scenarios, this method may prevent possible desired audio quality degradation such as reverberation effects caused by the beamformer 314*c*.

Figure 4A:
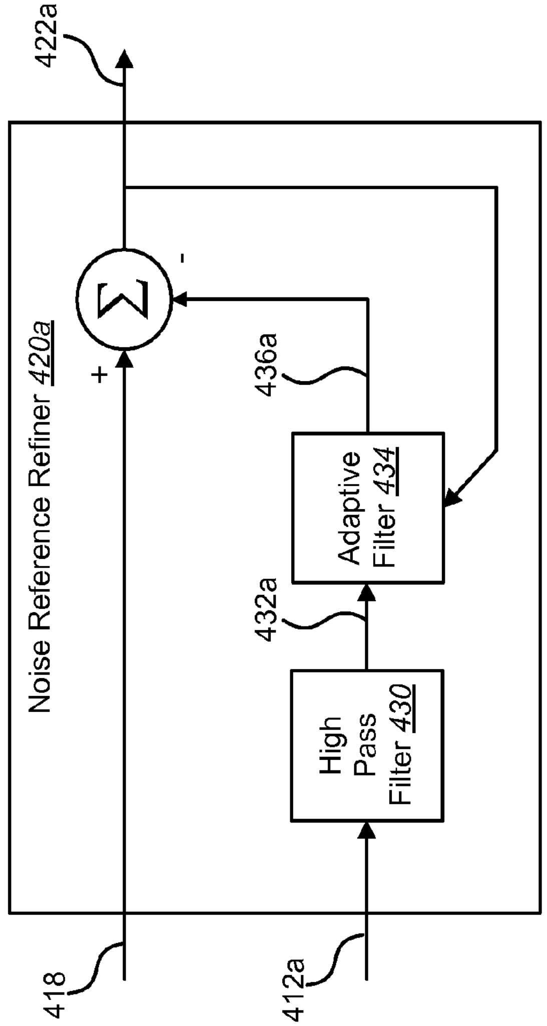
FIG. 4*a* is a block diagram illustrating some aspects of one possible configuration of a noise reference refiner.

FIG. 4*a* is a block diagram illustrating some aspects of one possible configuration of a noise reference refiner 420*a*. The noise reference signal 418 generated by the beamformer (e.g., beamformers 214, 314*a*-*c*) may still contain some residual desired audio and this may cause quality degradation at the output of the overall system. The purpose of the noise reference refiner 420*a* may be to remove further residual desired audio from the noise reference signal 418 (e.g., $z_{b2}(n)$).

Typically, if the microphones are not located very close to each other, the residual desired audio may have dominant high-frequency content. Thus, noise reference refining may be performed by removing high-frequency residual desired audio from the noise reference signal 418. An adaptive filter 434 may be used for removing residual desired audio from the noise reference signal 418. The first digital audio signal 412*a* (e.g., $z_{c1}(n)$) may be (optionally) provided to a high-pass filter 430. In some cases, the high-pass filter 430 may be optional. An IIR or FIR filter (e.g. $h_{HPF}(n)$) with a 1500-2000 Hz cutoff frequency may be used for high-pass filtering the first digital audio signal 412*a*. The high-pass filter 430 may be utilized to aid in removing only the high-frequency residual desired audio from the noise reference signal 418. The high-pass-filtered first digital audio signal 432*a* may be designated $z_i(n)$. The adaptive filter output 436*a* may be designated $z_{wr}(n)$. The adaptive filter weights (e.g., $w_r(n)$) may be updated using any method known in the art such as LMS, NLMS, etc. The refined noise reference signal 422*a* may be designated $z_{br}(n)$. The noise reference refiner 420*a* may be configured to implement a noise reference refining process as expressed in equations (11), (12), and (13):

$$z_i(n) = z_{c1}(n) * h_{HPF}(n) \tag{11}$$

$$z_{wr}(n) = \sum_{i=0}^{M-1} w_r(i) z_i(n-i) \tag{12}$$

$$z_{br}(n) = z_{b2}(n) - z_{wr}(n) \tag{13}$$

Figure 4B:
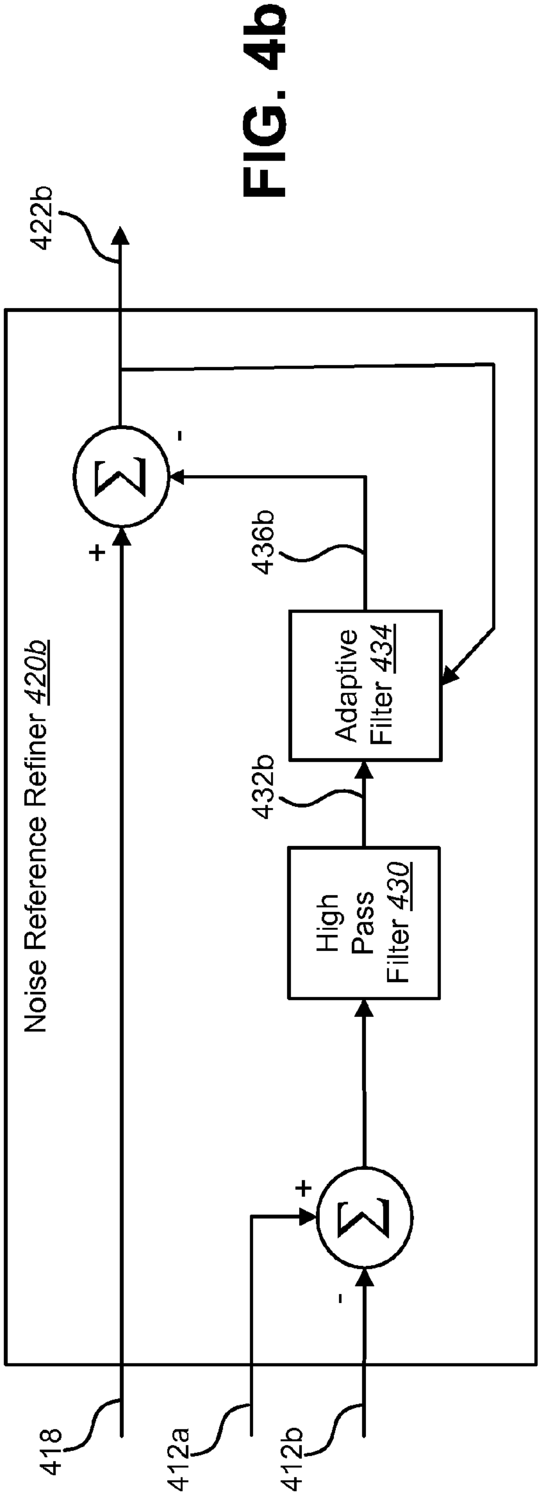
FIG. 4*b* is a block diagram illustrating some aspects of another possible configuration of a noise reference refiner.

FIG. 4*b* is a block diagram illustrating some aspects of another possible configuration of a noise reference refiner 420*b*. In this configuration, the difference between digital audio signals 412*a*, 412*b* (e.g. $z_{c1}(n)$, $z_{c2}(n)$) may be input into the optional high pass filter 430. The output 432*b* of the high-pass filter 430 may be designated $z_i(n)$. The output 436*b* of the adaptive filter 434 may be designated $z_{wr}(n)$. The refined noise reference signal 422*b* may be designated $z_{br}(n)$. The noise reference refiner 420*b* may be configured to implement a noise reference refining process as expressed in equations (14), (15), and (16):

$$z_i(n) = (z_{c1}(n) - z_{c2}(n)) * h_{HPF}(n) \tag{14}$$

$$z_{wr}(n) = \sum_{i=0}^{M-1} w_r(i) z_i(n-i) \tag{15}$$

$$z_{br}(n) = z_{b2}(n) - z_{wr}(n) \tag{16}$$

Figure 5A:
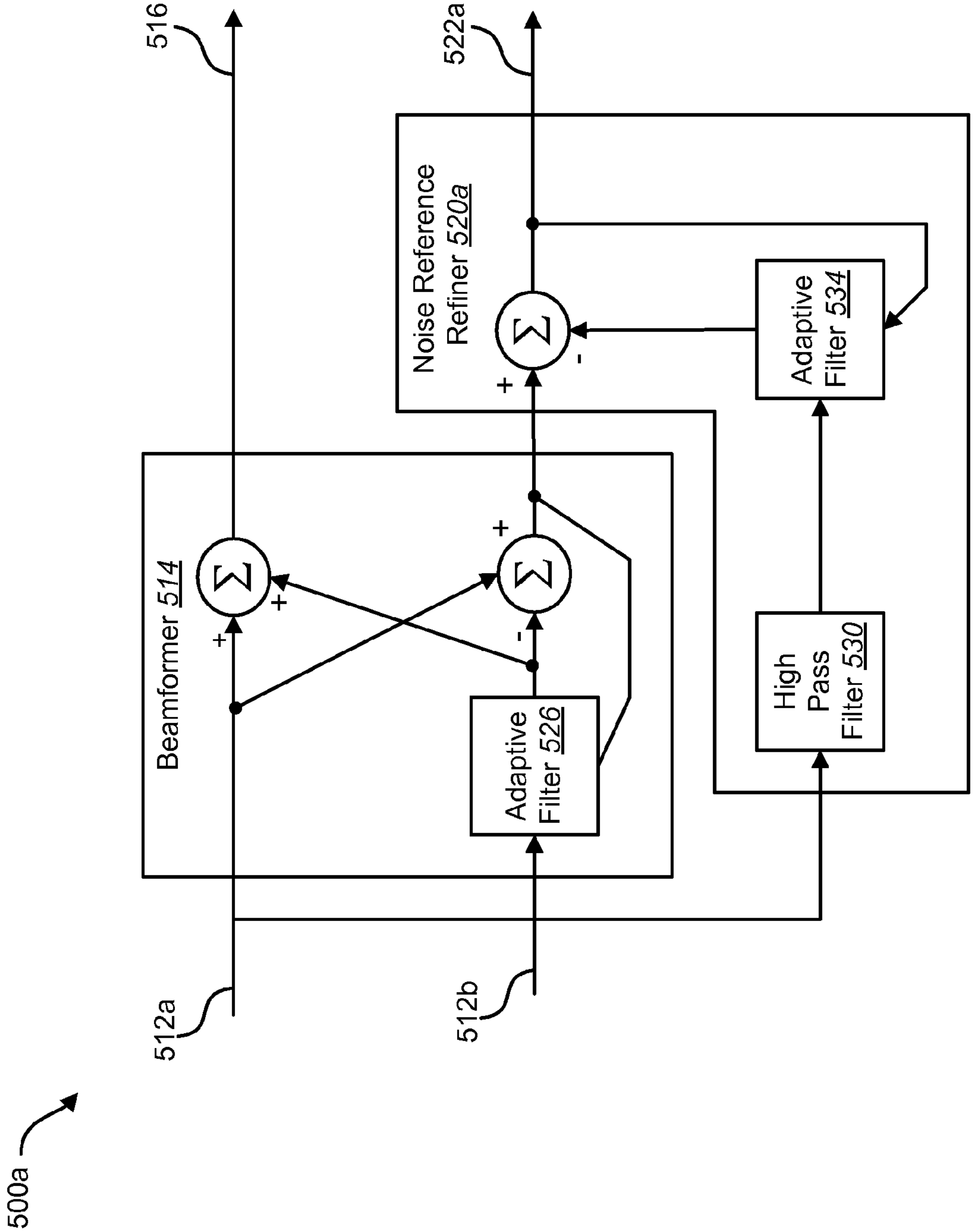
FIG. 5*a* is a more detailed block diagram illustrating some aspects of one possible configuration of a system including ambient noise suppression.

FIG. 5*a* is a more detailed block diagram illustrating some aspects of one possible configuration of a system 500*a* including ambient noise suppression. A beamformer 514 (including an adaptive filter 526) and a noise reference refiner 520*a* (including a high-pass filter 530 and an adaptive filter 534) may receive digital audio signals 512*a*, 512*b* and output a desired audio reference signal 516 and a refined noise reference signal 522*a*. In some cases, the high-pass filter 530 may be optional.

Figure 5B:
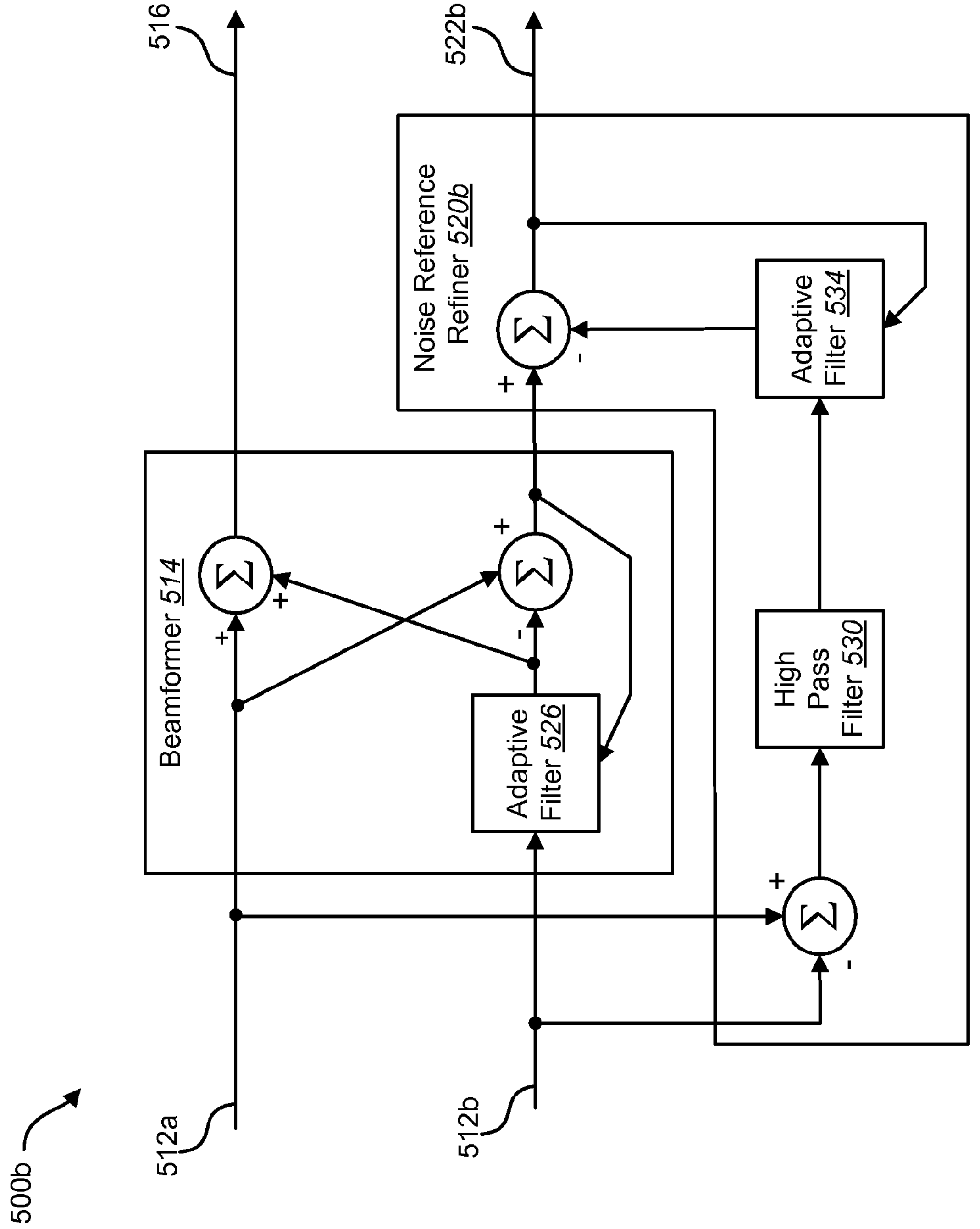
FIG. 5*b* is a more detailed block diagram illustrating some aspects of another possible configuration of a system including ambient noise suppression.

FIG. 5*b* is a more detailed block diagram illustrating some aspects of another possible configuration of a system 500*b* including ambient noise suppression. A beamformer 514 (including an adaptive filter 526) and a noise reference refiner 520*b* (including a high-pass filter 530 and an adaptive filter 534) may receive digital audio signals 512*a*, 512*b* and output a desired audio reference signal 516 and a refined noise reference signal 522*b*. In this configuration, the noise reference refiner 520*b* may input the difference between the first digital audio signal 512*a* and the second digital audio signal 512*b* into the optional high pass filter 530.

Figure 5C:
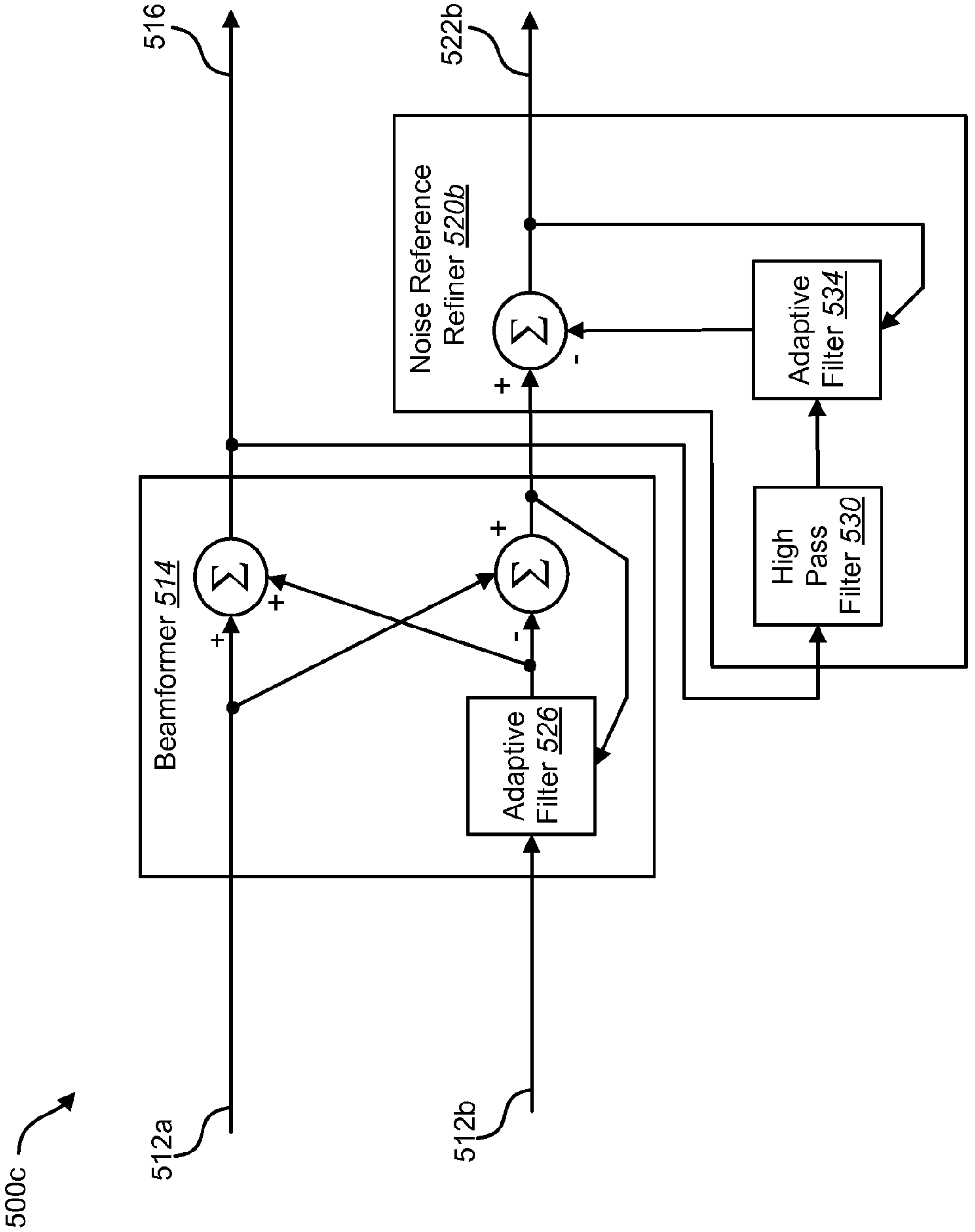
FIG. 5*c* illustrates an alternative configuration of a system including ambient noise suppression.

FIG. 5*c* illustrates an alternative configuration of a system 500*c* including ambient noise suppression. The system 500*c* of FIG. 5*c* is similar to the system 500*b* of FIG. 5*b*, except that in the system 500*c* of FIG. 5*c*, the desired audio reference signal 516 is provided as input to the high-pass filter 530 (instead of the difference between the first digital audio signal 512*a* and the second digital audio signal 512*b*).

Figure 5D:
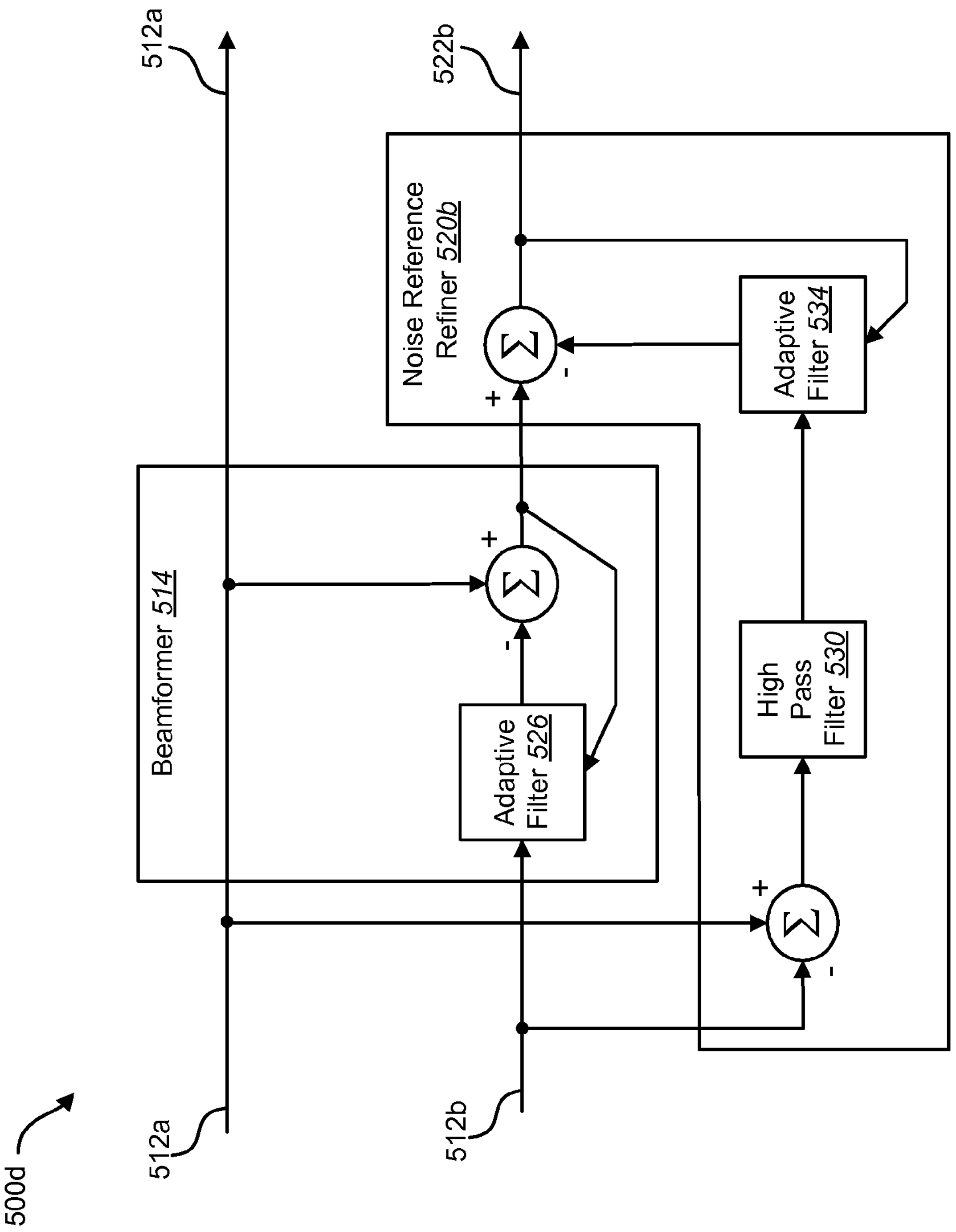
FIG. 5*d* illustrates another alternative configuration of a system including ambient noise suppression.

FIG. 5*d* illustrates another alternative configuration of a system 500*d* including ambient noise suppression. The system 500*d* of FIG. 5*d* is similar to the system 500*b* of FIG. 5*b*, except that in the system 500*d* of FIG. 5*d*, the output 512*a* of the beamformer 514 is equal to the first digital audio signal 512*a*.

Figure 6A:
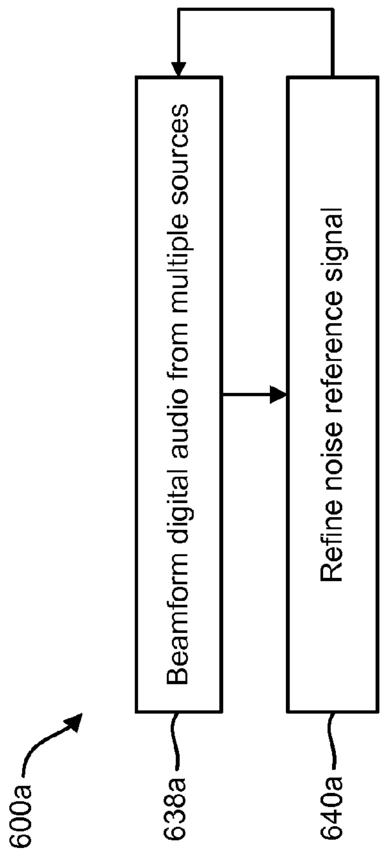
FIG. 6*a* is a flow diagram illustrating one example of a method for suppressing ambient noise.

FIG. 6*a* is a flow diagram illustrating one example of a method 600*a* for suppressing ambient noise. Digital audio from multiple sources is beamformed 638*a*. The digital audio from multiple sources may or may not have matching or similar energy levels. The digital audio from multiple sources may have matching or similar signal characteristics. For example, the digital audio from each source may include a dominant speech 106 and ambient noise 108. A desired audio reference signal (e.g., desired audio reference signal 216) and a noise reference signal (e.g., noise reference signal 218) may be generated via beamforming 638*a*. The noise reference signal may contain residual desired audio. The residual desired audio may be reduced or effectively eliminated from the noise reference signal by refining 640*a* the noise reference signal. The method 600*a* shown may be an ongoing process.

Figure 6B:
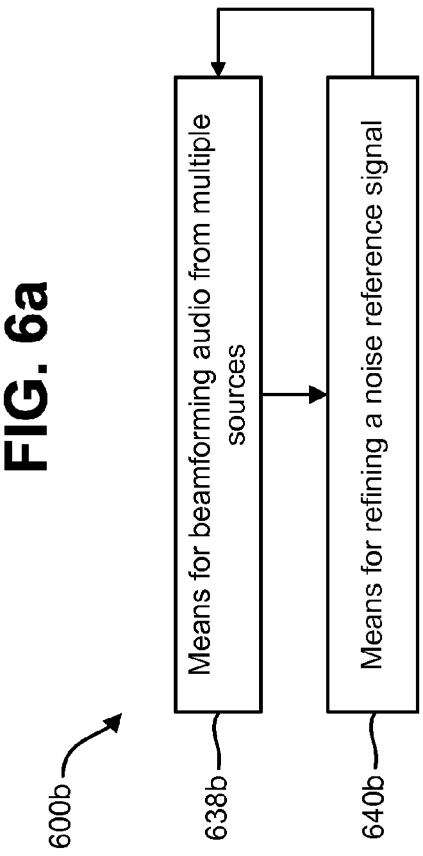
FIG. 6*b* is a flow diagram illustrating means-plus-function blocks corresponding to the method shown in FIG. 6*a;*

The method 600*a* described in FIG. 6*a* above may be performed by various hardware and/or software component(s) and/or module(s) corresponding to the means-plus-function blocks 600*b* illustrated in FIG. 6*b*. In other words, blocks 638*a* through 640*a* illustrated in FIG. 6*a* correspond to means-plus-function blocks 638*b* through 640*b* illustrated in FIG. 6*b*.

Figure 7A:
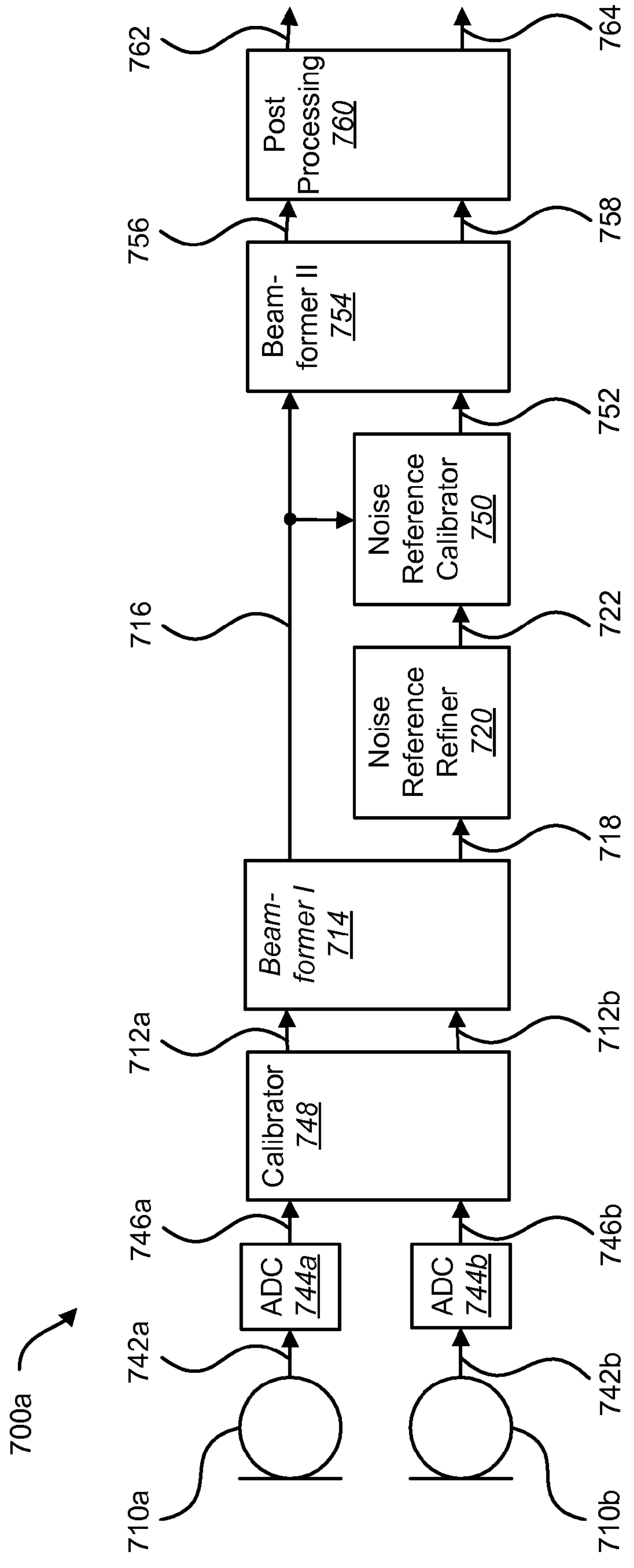
FIG. 7*a* is a block diagram illustrating some aspects of one possible configuration of a system including ambient noise suppression.

FIG. 7*a* is a block diagram illustrating some aspects of one possible configuration of a system 700*a* including ambient noise suppression. A system 700*a* including ambient noise suppression may include transducers (e.g., microphones) 710*a*, 710*b*, Analog-to-Digital Converters (ADCs) 744*a*, 744*b*, a calibrator 748, a first beamformer 714, a noise reference refiner 720, a noise reference calibrator 750, a second beamformer 754, and post processing components 760.

The transducers 710*a*, 710*b* may capture sound information and convert it to analog signals 742*a*, 742*b*. The transducers 710*a*, 710*b* may include any device or devices used for converting sound information into electrical (or other) signals. For example, they may be electro-acoustic transducers such as microphones. The ADCs 744*a*, 744*b*, may convert the analog signals 742*a*, 742*b*, captured by the transducers 710*a*, 710*b* into uncalibrated digital audio signals 746*a*, 746*b*. The ADCs 744*a*, 744*b* may sample analog signals at a sampling frequency $f_s$.

The two uncalibrated digital audio signals 746*a*, 746*b* may be calibrated by the calibrator 748 in order to compensate for differences in microphone sensitivities and for differences in near-field speech levels. The calibrated digital audio signals 712*a*, 712*b*, may be processed by the first beamformer 714 to provide a desired audio reference signal 716 and a noise reference signal 718. The first beamformer 714 may be a fixed beamformer or an adaptive beamformer. The noise reference refiner 720 may refine the noise reference signal 718 to further remove residual desired audio.

The refined noise reference signal 722 may also be calibrated by the noise reference calibrator 750 in order to compensate for attenuation effects caused by the first beamformer 714. The desired audio reference signal 716 and the calibrated noise reference signal 752 may be processed by the second beamformer 754 to produce the second desired audio signal 756 and the second noise reference signal 758. The second desired audio signal 756 and the second noise reference signal 758 may optionally undergo post processing 760 to remove more residual noise from the second desired audio reference signal 756. The desired audio output signal 762 and the noise reference output signal 764 may be transmitted, output via a speaker, processed further, or otherwise utilized.

Figure 7B:
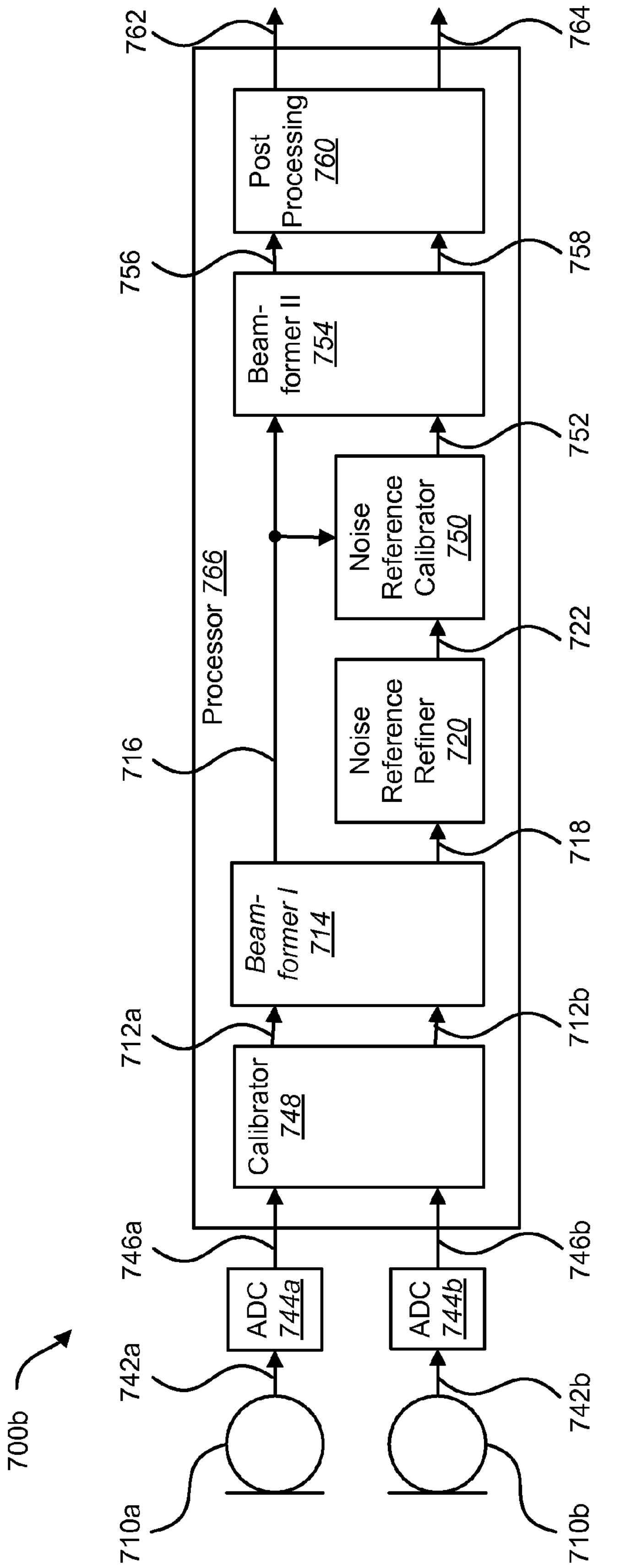
FIG. 7*b* is a block diagram illustrating some aspects of another possible configuration of a system including ambient noise suppression.

FIG. 7*b* is a block diagram illustrating some aspects of another possible configuration of a system 700*b* including ambient noise suppression. A processor 766 may execute instructions and/or perform operations in order to implement the calibrator 748, first beamformer 714, noise reference refiner 720, noise reference calibrator 750, second beamformer 754, and/or post processing 760.

Figure 7C:
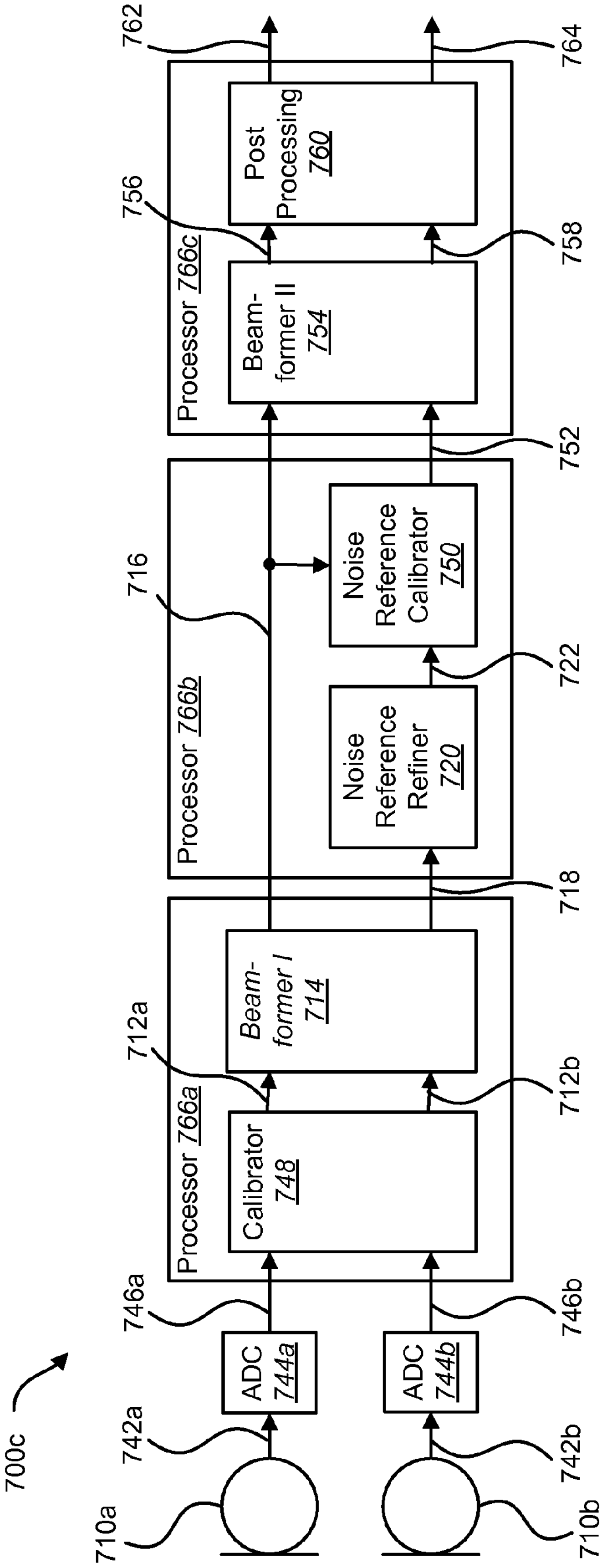
FIG. 7*c* is a block diagram illustrating some aspects of another possible configuration of a system including ambient noise suppression.

FIG. 7*c* is a block diagram illustrating some aspects of another possible configuration of a system 700*c* including ambient noise suppression. A processor 766*a* may execute instructions and/or perform operations in order to implement the calibrator 748 and first beamformer 714. Another processor 766*b* may execute instructions and/or perform operations in order to implement the noise reference refiner 720 and noise reference calibrator 750. Another processor 766*c* may execute instructions and/or perform operations in order to implement the second beamformer 754 and post processing 760. Individual processors may be arranged to handle each block individually or any combination of blocks.

Figure 8A:
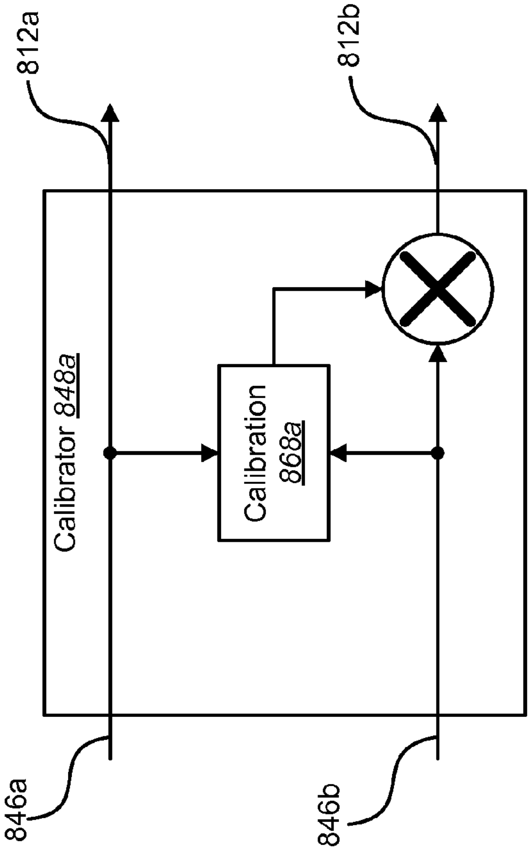
FIG. 8*a* is a block diagram illustrating some aspects of one possible configuration of a calibrator.

FIG. 8*a* is a block diagram illustrating some aspects of one possible configuration of a calibrator 848*a*. The calibrator 848*a* may serve two purposes: to compensate for any difference in microphone sensitivities, and to compensate for the near-field desired audio level difference in the uncalibrated digital audio signals 846*a*, 846*b*. Microphone sensitivity measures the strength of voltage generated by a microphone for a given input pressure of the incident acoustic field. If two microphones have different sensitivities, they will produce different voltage levels for the same input pressure. This difference may be compensated before performing beamforming. A second factor that may be considered is the near-field effect. Since the user holding the mobile device may be in close proximity to the two microphones, any change in handset orientation may result in significant differences between signal levels captured by the two microphones. Compensation of this signal level difference may aid the first-stage beamformer in generating a better noise reference signal.

The differences in microphone sensitivity and audio level (due to the near-field effect) may be compensated by computing a set of calibration factors (which may also be referred to as scaling factors) and applying them to one or more uncalibrated digital audio signals 846*a*, 846*b*.

The calibration block 868*a* may compute a calibration factor and apply it to one of the uncalibrated digital audio signals 846*a*, 846*b* so that the signal level in the second digital audio signal 812*b* is close to that of the first digital audio signal 812*a*.

A variety of methods may be used for computing the appropriate calibration factor. One approach for computing the calibration factor may be to compute the single tap Wiener filter coefficient and use it as the calibration factor for the second uncalibrated digital audio signal 846*b*. The single tap Wiener filter coefficient may be computed by calculating the cross-correlation between the two uncalibrated digital audio signals 846*a*, 846*b*, and the energy of the second uncalibrated digital audio signal 846*b*. The two uncalibrated digital audio signals 846*a*, 846*b* may be designated $z_1(n)$ and $z_2(n)$ where n denotes the time instant or sample number. The uncalibrated digital audio signals 846*a*, 846*b* may be segmented into frames (or blocks) of length N. For each frame k, the block cross-correlation $\hat{R}_{12}(k)$ and block energy estimate $\hat{P}_{22}(k)$ may be calculated as shown in equations (17) and (18):

$$\hat{R}_{12}(k) = \sum_{n=(k-1)N}^{kN} z_1(n)z_2(n) \tag{17}$$

$$\hat{P}_{22}(k) = \sum_{n=(k-1)N}^{kN} z_2(n)z_2(n) \tag{18}$$

The block cross-correlation $\hat{R}_{12}(k)$ and block energy estimate $\hat{P}_{22}(k)$ may be optionally smoothed using an exponential averaging method for minimizing the variance of the estimates as shown in equations (19) and (20):

$$\overline{R}_{12}(k)=\lambda_1\overline{R}_{12}(k-1)+(1-\lambda_1)\hat{R}_{12}(k) \tag{19}$$

$$\overline{P}_{22}(k)=\lambda_2\overline{P}_{22}(k-1)+(1-\lambda_2)\hat{P}_{22}(k) \tag{20}$$

$\lambda_1$ and $\lambda_2$ are averaging constants that may take values between 0 and 1. The higher the values of $\lambda_1$ and $\lambda_2$ are, the smoother the averaging process(es) will be, and the lower the variance of the estimates will be. Typically, values in the range: 0.9-0.99 have been found to give good results.

The calibration factor $\hat{c}_2(k)$ for the second uncalibrated digital audio signal 846*b* may be found by computing the ratio of the block cross-correlation estimate and the block energy estimate as shown in equation (21):

$$\hat{c}_2(k) = \frac{\overline{R}_{12}(k)}{\overline{P}_{22}(k)} \tag{21}$$

The calibration factor $\hat{c}_2(k)$ may be optionally smoothed in order to minimize abrupt variations, as shown in equation (22). The smoothing constant may be chosen in the range: 0.7-0.9.

$$c_2(k)=\beta_2 c_2(k-1)+(1-\beta_2)\hat{c}_2(k) \tag{22}$$

The estimate of the calibration factor may be improved by computing and updating the calibration factor only during desired audio activity periods. Any method of Voice Activity Detection (VAD) known in the art may be used for this purpose.

The calibration factor may alternatively be estimated using a maximum searching method. In this method, the block energy estimates $\hat{P}_{11}(k)$ and $\hat{P}_{22}(k)$ of the two uncalibrated digital audio signals 846*a*, 846*b* may be searched for desired audio energy maxima and the ratio of the two maxima may be used for computing the calibration factor. The block energy estimates $\hat{P}_{11}(k)$ and $\hat{P}_{22}(k)$ may be computed as shown in equations (23) and (24):

$$\hat{P}_{11}(k)=\sum_{n=(k-1)N}^{kN} z_1(n)z_1(n) \tag{23}$$

$$\hat{P}_{22}(k)=\sum_{n=(k-1)N}^{kN} z_2(n)z_2(n) \tag{24}$$

The block energy estimates $\hat{P}_{11}(k)$ and $\hat{P}_{22}(k)$ may be optionally smoothed as shown in equations (25) and (26):

$$\overline{P}_{11}(k)=\lambda_3\overline{P}_{11}(k-1)+(1-\lambda_3)\hat{P}_{11}(k) \tag{25}$$

$$\overline{P}_{22}(k)=\lambda_2\overline{P}_{22}(k-1)+(1-\lambda_2)\hat{P}_{22}(k) \tag{26}$$

$\lambda_3$ and $\lambda_2$ are averaging constants that may take values between 0 and 1. The higher the values of $\lambda_3$ and $\lambda_2$ are, the smoother the averaging process(es) will be, and the lower the variance of the estimates will be. Typically, values in the range: 0.7-0.8 have been found to give good results. The desired audio maxima of the two uncalibrated digital audio signals 846*a*, 846*b* (e.g., $\hat{Q}_1(m)$ and $\hat{Q}_2$ (M) where m is the multiple frame index number) may be computed by searching for the maximum of the block energy estimates over several frames, say K consecutive frames as shown in equations (27) and (28):

$$\hat{Q}_1(m)=\max\{\overline{P}_{11}((m-1)k),\overline{P}_{11}((m-1)k-1),\ldots,\overline{P}_{11}((m-1)k-K+1)\} \tag{27}$$

$$\hat{Q}_2(m)=\max\{\overline{P}_{22}((m-1)k),\overline{P}_{22}((m-1),\ldots,\overline{P}_{22}((m-1)k-K+1)\} \tag{28}$$

The maxima values may optionally be smoothed to obtain smoother estimates as shown in equations (29) and (30):

$$\overline{Q}_1(m)=\lambda_4\overline{Q}_1(m-1)+(1-\lambda_4)\hat{Q}_1(m) \tag{29}$$

$$\overline{Q}_2(m)=\lambda_5\overline{Q}_2(m-1)+(1-\lambda_5)\hat{Q}_2(m) \tag{30}$$

$\lambda_4$ and $\lambda_5$ are averaging constants that may take values between 0 and 1. The higher the values of $\lambda_4$ and $\lambda_5$ are, the smoother the averaging process(es) will be, and the lower the variance of the estimates will be. Typically, the values of averaging constants are chosen in the range: 0.5-0.7. The calibration factor for the second uncalibrated digital audio signal 846*b* may be estimated by computing the square root of the ratio of the two uncalibrated digital audio signals 846*a*, 846*b* as shown in equation (31):

$$\hat{c}_2(m)=\sqrt{\frac{\overline{Q}_1(m)}{\overline{Q}_2(m)}} \tag{31}$$

The calibration factor $\hat{c}_2(m)$ may optionally be smoothed as shown in equation (32):

$$c_2(m)=\beta_3 c_2(m-1)+(1-\beta_3)\hat{c}_2(m) \tag{32}$$

$\beta_3$ is an averaging constant that may take values between 0 and 1. The higher the value of $\beta_3$ is, the smoother the averaging process will be, and the lower the variance of the estimates will be. This smoothing process may minimize abrupt variation in the calibration factor for the second uncalibrated digital audio signal 846*b*. The calibration factor, as calculated by the calibration block 868*a*, may be used to multiply the second uncalibrated digital audio signal 846*b*. This process may result in scaling the second uncalibrated digital audio signal 846*b* such that the desired audio energy levels in the digital audio signals 812*a*, 812*b* are balanced before beamforming.

Figure 8B:
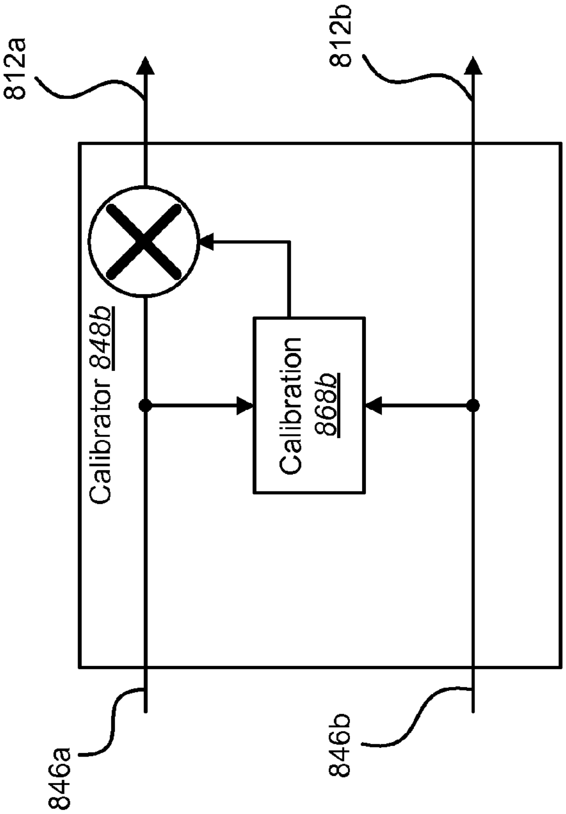
FIG. 8*b* is a block diagram illustrating some aspects of another possible configuration of a calibrator.

FIG. 8*b* is a block diagram illustrating some aspects of another possible configuration of a calibrator 848*b*. In this configuration, the inverse of the calibration factor (as calculated by the calibration block 868*b*) may be applied to the first uncalibrated digital audio signal 846*a*. This process may result in scaling the first uncalibrated digital audio signal 846*a* such that the desired audio energy levels in the digital audio signals 812*a*, 812*b* are balanced before beamforming.

Figure 8C:
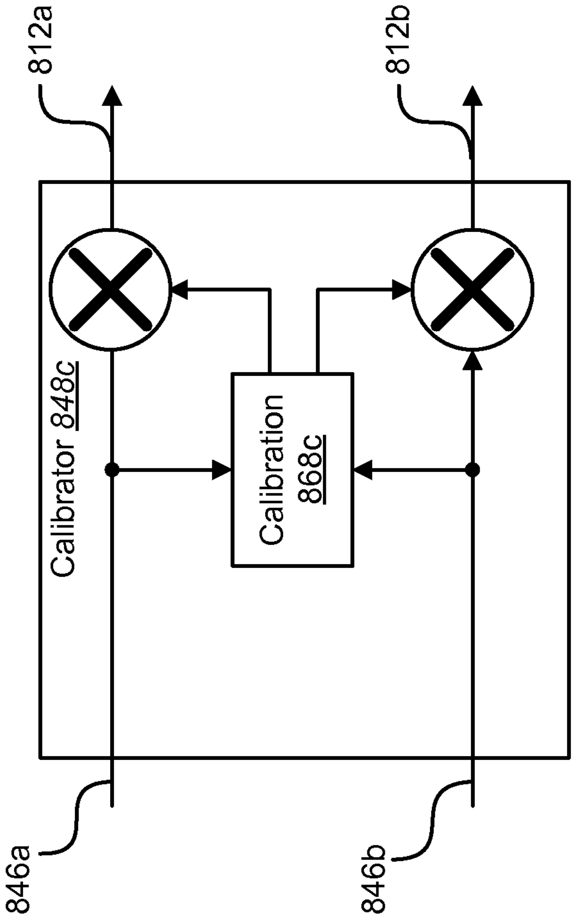
FIG. 8*c* is a block diagram illustrating some aspects of another possible configuration of a calibrator.

FIG. 8*c* is a block diagram illustrating some aspects of another possible configuration of a calibrator 848*c*. In this configuration, two calibration factors that will balance the desired audio energy levels in the digital audio signals 812*a*, 812*b* may be calculated by the calibration block 868*c*. These two calibration factors may be applied to the uncalibrated digital audio signals 846*a*, 846*b*.

Once the uncalibrated digital audio signals 846*a*, 846*b* are calibrated, the first digital audio signal 812*a* and the second digital audio signal 812*b* may be beamformed and/or refined as discussed above.

Figure 9A:
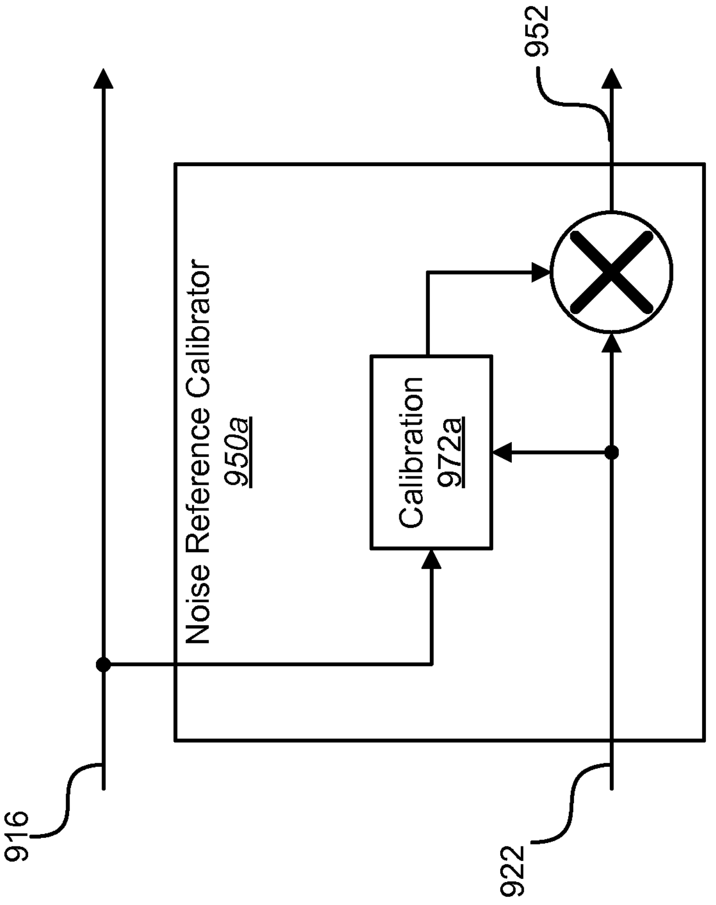
FIG. 9*a* is a block diagram illustrating some aspects of one possible configuration of a noise reference calibrator.

FIG. 9*a* is a block diagram illustrating some aspects of one possible configuration of a noise reference calibrator 950*a*. The noise reference signal 922, which may be generated by the first beamformer 714, may suffer from an attenuation problem. The strength of noise in the refined noise reference signal 922 may be much smaller compared to the strength of noise in the desired audio reference signal 916. The refined noise reference signal 922 may be calibrated (e.g., scaled) by the calibration block 972*a* before performing secondary beamforming.

The calibration factor for the noise reference calibration may be computed using noise floor estimates. The calibration block 972*a* may compute noise floor estimates for the desired audio reference signal 916 and the refined noise reference signal 922. The calibration block 972*a* may accordingly compute a calibration factor and apply it to the refined noise reference signal 922.

The block energy estimates of the desired audio reference signal (e.g., $z_{b1}(n)$) and the refined noise reference signal (e.g., $z_{br}(n)$) may be designated $P_{b1}(k)$ and $P_{br}(k)$, respectively, where k is the frame index.

The noise floor estimates of the block energies (e.g., $\hat{Q}_{b1}(m)$ and $\hat{Q}_{br}(m)$ where m is the frame index) may be computed by searching for a minimum value over a set of frames (e.g., K frames) as expressed in equations (33) and (34):

$$\hat{Q}_{b1}(m)=\min\{P_{b1}((m-1)k),P_{b1}((m-1)k-1),\ldots,P_{b1}((m-1)k-K+1)\} \tag{33}$$

$$\hat{Q}_{br}(m)=\min\{P_{br}((m-1)k),P_{br}((m-1)k-1),\ldots,P_{br}((m-1)k-K+1)\} \tag{34}$$

The noise floor estimates (e.g. $\hat{Q}_{b1}(m)$ and $\hat{Q}_{br}(m)$) may optionally be smoothed (e.g., the smoothed noise floor estimates may be designated $\overline{Q}_{b1}(m)$ and $\overline{Q}_{br}(m)$) using an exponential averaging method as shown in equations (35) and (36):

$$\overline{Q}_{b1}(m)=\lambda_6\overline{Q}_{b1}(m-1)+(1-\lambda_6)\hat{Q}_{b1}(m) \quad (35)$$

$$\overline{Q}_{br}(m)=\lambda_7\overline{Q}_{br}(m-1)+(1-\lambda_7)\hat{Q}_{br}(m) \quad (36)$$

$\lambda_6$ and $\lambda_7$ are averaging constants that may take values between 0 and 1. The higher the values of $\lambda_6$ and $\lambda_7$ are, the smoother the averaging process(es) will be, and the lower the variance of the estimates will be. The averaging constants are typically chosen in the range: 0.7-0.8. The refined noise reference 922 calibration factor may be designated $\hat{c}_{nr}(m)$ and may be computed as expressed in equation (37):

$$\hat{c}_{nr}(m)=\frac{\overline{Q}_{b1}(m)}{\overline{Q}_{br}(m)} \quad (37)$$

The estimated calibration factor (e.g., $\hat{c}_{nr}(m)$) may be optionally smoothed (e.g., resulting in $c_{nr}(m)$) to minimize discontinuities in the calibrated noise reference signal 952 as expressed in equation (38):

$$c_{nr}(m)=\beta_4 c_{nr}(m-1)+(1-\beta_4)\hat{c}_{nr}(m) \quad (38)$$

$\beta_4$ is an averaging constant that may take values between 0 and 1. The higher the value of $\beta_4$ is, the smoother the averaging process will be, and the lower the variance of the estimates will be. Typically, the averaging constant is chosen in the range: 0.7-0.8. The calibrated noise reference signal 952 may be designated $z_{nf}(n)$.

Figure 9B:
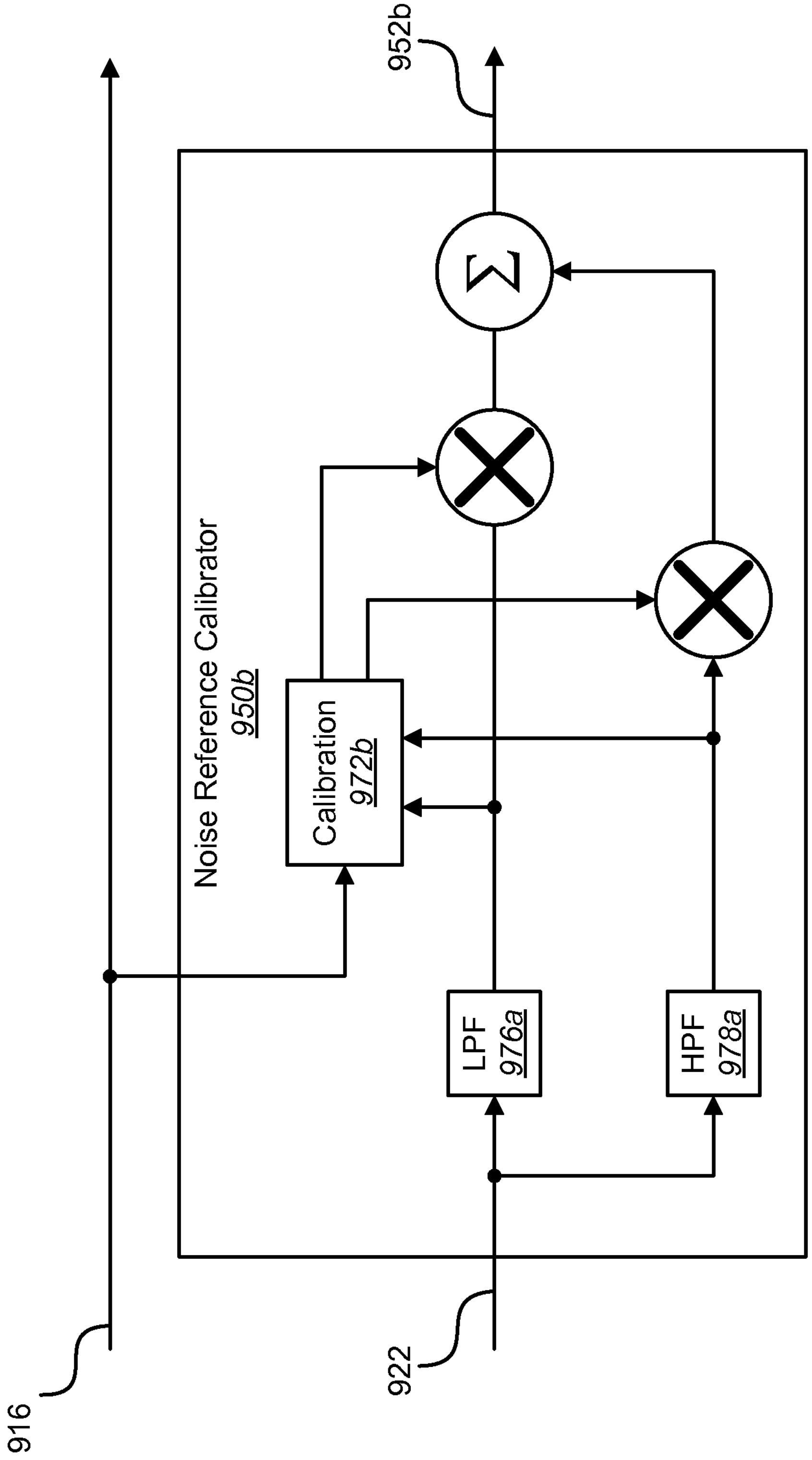
FIG. 9*b* is a block diagram illustrating some aspects of another possible configuration of a noise reference calibrator.

FIG. 9*b* is a block diagram illustrating some aspects of another possible configuration of a noise reference calibrator 950*b*. The refined noise reference signal 922 may be divided into two (or more) sub-bands and a separate calibration factor may be computed by the calibration block 972*b* and applied for each sub-band. The low and high-frequency components of the refined noise reference signal 922 may benefit from having different calibration values.

If the refined noise reference signal 922 is divided into two sub-bands, as shown in FIG. 9*b*, the sub-bands may be filtered by a low-pass filter (LPF) 976*a* and a high-pass filter (HPF) 978*a*, respectively. If the refined noise reference signal 922 is divided into more than two sub-bands, then each sub-band may be filtered by a band-pass filter.

The calibration block 972*b* may compute noise floor estimates for the desired audio reference signal 916 and the sub-bands of the refined noise reference signal 922. The calibration block 972*b* may accordingly compute calibration factors and apply them to the sub-bands of the refined noise reference signal 922. The block energy estimates of the desired audio reference signal (e.g., $z_{b1}(n)$) and the sub-bands of the refined noise reference signal (e.g., $z_{br}(n)$) may be designated $P_{b1}(k)$, $P_{nLPF}(k)$, and $P_{nHPF}(k)$ respectively, where k is the frame index. The noise floor estimates of the block energies (e.g., $\hat{Q}_{b1}(m)$, $\hat{Q}_{nLPF}(m)$, and $\hat{Q}_{nHPF}(m)$ where m is the frame index) may be computed by searching for a minimum value over a set of frames (e.g., K frames) as expressed in equations (39), (40), and (41):

$$\hat{Q}_{b1}(m)=\min\{P_{b1}((m-1)k),P_{b1}((m-1)k-1),\ldots,P_{b1}((m-1)k-K+1)\} \quad (39)$$

$$\hat{Q}_{nLPF}(m)=\min\{P_{nLPF}((m-1)k),P_{nLPF}((m-1)k-1),\ldots,P_{nLPF}((m-1)k-K+1)\} \quad (40)$$

$$\hat{Q}_{nHPF}(m)=\min\{P_{nHPF}((m-1)k),P_{nHPF}((m-1)k-1),\ldots,P_{nHPF}((m-1)k-K+1)\} \quad (41)$$

The noise floor estimates (e.g., $\hat{Q}_{b1}(m)$, $\hat{Q}_{nLPF}(m)$, and $\hat{Q}_{nHPF}(m)$) may optionally be smoothed (e.g., the smoothed noise floor estimates may be designated $\overline{Q}_{b1}(m)$ $\overline{Q}_{nLPF}(m)$, and $\overline{Q}_{nHPF}(m)$) using an exponential averaging method as shown in equations (42), (43), and (44):

$$\overline{Q}_{b1}(m)=\lambda_6\overline{Q}_{b1}(m-1)+(1-\lambda_6)\hat{Q}_{b1}(m) \quad (42)$$

$$\overline{Q}_{nLPF}(m)=\lambda_8\overline{Q}_{nLPF}(m-1)+(1-\lambda_8)\hat{Q}_{nLPF}(m) \quad (43)$$

$$\overline{Q}_{nHPF}(m)=\lambda_9\overline{Q}_{nHPF}(m-1)+(1-\lambda_9)\hat{Q}_{nHPF}(m) \quad (44)$$

$\lambda_8$ and $\lambda_9$ are averaging constants that may take values between 0 and 1. The higher the values of $\lambda_8$ and $\lambda_9$ are, the smoother the averaging process(es) will be, and the lower the variance of the estimates will be. Typically, averaging constants in the range: 0.5-0.8 may be used. The refined noise reference 922 calibration factors may be designated $\hat{c}_{1LPF}(m)$ and $\hat{c}_{1HPF}(m)$ and may be computed as expressed in equations (45) and (46):

$$\hat{c}_{1LPF}(m)=\frac{\overline{Q}_{b1}(m)}{\overline{Q}_{nLPF}(m)} \quad (45)$$

$$\hat{c}_{1HPF}(m)=\frac{\overline{Q}_{b1}(m)}{\overline{Q}_{nHPF}(m)} \quad (46)$$

The estimated calibration factors may be optionally smoothed (e.g., resulting in $c_{1LPF}(m)$ and $c_{1HPF}(m)$) to minimize discontinuities in the calibrated noise reference signal 952*b* as expressed in equations (47) and (48):

$$c_{1LPF}(m)=\beta_5 c_{1LPF}(m-1)+(1-\beta_5)\hat{c}_{1LPF}(m) \quad (47)$$

$$c_{1HPF}(m)=\beta_6 c_{1HPF}(m-1)+(1-\beta_6)\hat{c}_{1HPF}(m) \quad (48)$$

$\beta_5$ and $\beta_6$ are averaging constants that may take values between 0 and 1. The higher the values of $\beta_5$ and $\beta_6$ are, the smoother the averaging process will be, and the lower the variance of the estimates will be. Typically, averaging constants in the range: 0.7-0.8 may be used. The calibrated noise reference signal 952*b* may be the summation of the two scaled sub-bands of the refined noise reference signal 922 and may be designated $z_{nf}(n)$.

Figure 9C:
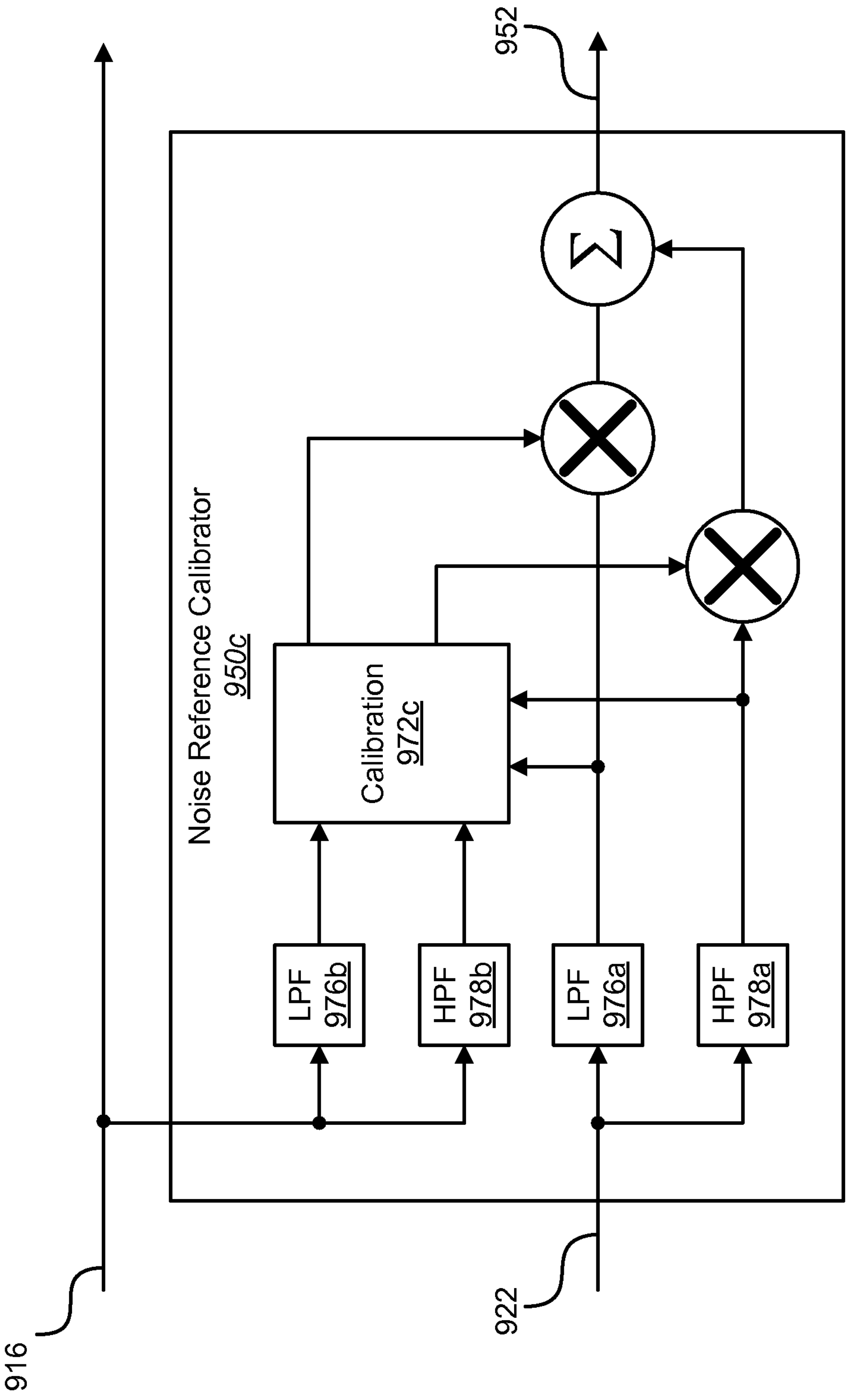
FIG. 9*c* is a block diagram illustrating some aspects of another possible configuration of a noise reference calibrator.

FIG. 9*c* is a block diagram illustrating some aspects of another possible configuration of a noise reference calibrator 950*c*. The refined noise reference signal 922 and the desired audio reference signal 916 may be divided into two sub-bands and a separate calibration factor may be computed by the calibration block 972*c* and applied for each sub-band. The low and high-frequency components of the refined noise reference signal 922 may benefit from different calibration values.

The desired audio reference signal 916 may be divided and filtered by a low-pass filter 976*b* and a high-pass filter 978*b*. The refined noise reference signal 922 may be divided and filtered by a low-pass filter 976*a* and a high-pass filter 978*a*. The calibration block 972*c* may compute noise floor estimates for the sub-bands of the desired audio reference signal 916 and the sub-bands of the refined noise reference signal 922. The calibration block 972*c* may accordingly compute calibration factors and apply them to the sub-bands of the refined noise reference signal 922. The block energy estimates of the sub-bands of the desired audio reference signal (e.g., $z_{b1}(n)$) and the sub-bands of the refined noise reference signal (e.g., $z_{br}(n)$) may be designated $P_{LPF}(k)$, $P_{HPF}(k)$, $P_{nLPF}(k)$, and $P_{nHPF}(k)$ respectively, where k is the frame index. The noise floor estimates of the block energies (e.g., $\hat{Q}_{LPF}$(m), $\hat{Q}_{HPF}$(m), $\hat{Q}_{nLPF}$(m), and $\hat{Q}_{nHPF}$(m) where m is the frame index) may be computed by searching for a minimum value over a set of frames (e.g. K frames) as expressed in equations (49), (50), (51), and (52):

$$\hat{Q}_{LPF}(m)=\min\{P_{LPF}((m-1)k),P_{LPF}((m-1)k-1),\ldots,P_{LPF}((m-1)k-K+1)\} \quad (49)$$

$$\hat{Q}_{HPF}(m)=\min\{P_{HPF}((m-1)k),P_{HPF}((m-1)k-1),\ldots,P_{HPF}((m-1)k-K+1)\} \quad (50)$$

$$\hat{Q}_{nLPF}(m)=\min\{P_{nLPF}((m-1)k),P_{nLPF}((m-1)k-1),\ldots,P_{nLPF}((m-1)k-K+1)\} \quad (51)$$

$$\hat{Q}_{nHPF}(m)=\min\{P_{nHPF}((m-1)k),P_{nHPF}((m-1)k-1),\ldots,P_{nHPF}((m-1)k-K+1)\} \quad (52)$$

The noise floor estimates (e.g., $\hat{Q}_{LPF}$(m), $\hat{Q}_{HPF}$(m), $\hat{Q}_{nLPF}$(m), and $\hat{Q}_{nHPF}$(m)) may optionally be smoothed (e.g., the smoothed noise floor estimates may be designated $\overline{Q}_{HPF}$(m), $\overline{Q}_{LPF}$(m), $\overline{Q}_{nLPF}$(m), and $\overline{Q}_{nHPF}$(m)) using an exponential averaging method as shown in equations (53), (54), (55), and (56):

$$\overline{Q}_{LPF}(m)=\lambda_{10}\overline{Q}_{LPF}(m-1)+(1-\lambda_{10})\hat{Q}_{LPF}(m) \quad (53)$$

$$\overline{Q}_{HPF}(m)=\lambda_{11}\overline{Q}_{HPF}(m-1)+(1-\lambda_{11})\hat{Q}_{HPF}(m) \quad (54)$$

$$\overline{Q}_{nLPF}(m)=\lambda_{8}\overline{Q}_{nLPF}(m-1)+(1-\lambda_{8})\hat{Q}_{nLPF}(m) \quad (55)$$

$$\overline{Q}_{nHPF}(m)=\lambda_{9}\hat{Q}_{nHPF}(m-1)+(1-\lambda_{9})\hat{Q}_{nHPF}(m) \quad (56)$$

$\lambda_{10}$ and $\lambda_{11}$ are averaging constants that may take values between 0 and 1. The higher the values of $\lambda_{10}$ and $\lambda_{11}$ are, the smoother the averaging process(es) will be, and the lower the variance of the estimates will be. The averaging constants may be chosen in the range: 0.5-0.8. The refined noise reference 922 calibration factors may be designated $\hat{c}_{2LPF}$(m) and $\hat{c}_{2HPF}$(m) and may be computed as expressed in equations (57) and (58):

$$\hat{c}_{2LPF}(m)=\frac{\overline{Q}_{LPF}(m)}{\overline{Q}_{nLPF}(m)} \quad (57)$$

$$\hat{c}_{2HPF}(m)=\frac{\overline{Q}_{HPF}(m)}{\overline{Q}_{nHPF}(m)} \quad (58)$$

The estimated calibration factors may be optionally smoothed (e.g., resulting in $c_{2LPF}$(m) and $c_{2HPF}$(m)) to minimize discontinuities in the calibrated noise reference signal 952 as expressed in equations (59) and (60):

$$c_{2LPF}(m)=\beta_7 c_{2LPF}(m-1)+(1-\beta_7)\hat{c}_{2LPF}(m) \quad (59)$$

$$c_{2HPF}(m)=\beta_8 c_{2HPF}(m-1)+(1-\beta_8)\hat{c}_{2HPF}(m) \quad (60)$$

$\beta_7$ and $\beta_8$ are averaging constants that may take values between 0 and 1. The higher the values of $\beta_7$ and $\beta_8$ are, the smoother the averaging process will be, and the lower the variance of the estimates will be. Typically, values in the range: 0.7-0.8 may be used. The calibrated noise reference signal 952 may be the summation of the two scaled sub-bands of the refined noise reference signal 922 and may be designated $z_{nf}$(n).

Figure 10:
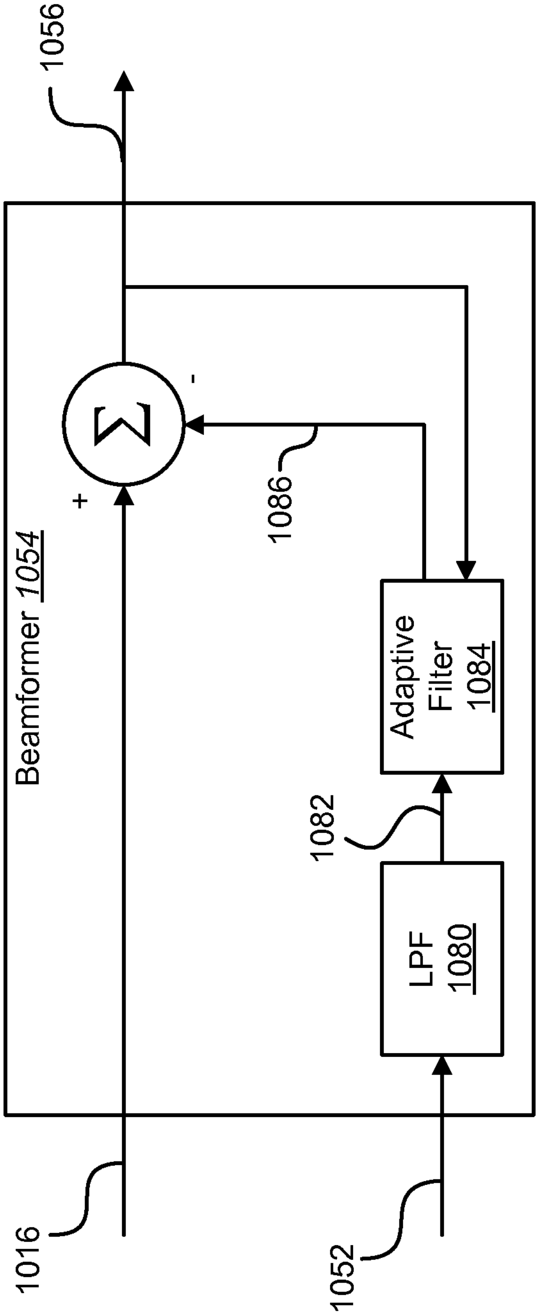
FIG. 10 is a block diagram illustrating some aspects of one possible configuration of a beamformer.

FIG. 10 is a block diagram illustrating some aspects of one possible configuration of a beamformer 1054. This beamformer 1054 may be utilized as the second beamformer 754 discussed earlier.

The primary purpose of secondary beamforming may be to utilize the calibrated refined noise reference signal 1052 and remove more noise from the desired audio reference signal 1016. The input to the adaptive filter 1084 may be chosen to be the calibrated refined noise reference signal 1052. The input signal may be optionally low-pass filtered by the LPF 1080 in order to prevent the beamformer 1054 from aggressively suppressing high-frequency content in the desired audio reference signal 1016. Low-pass filtering the input may help ensure that the second desired audio signal 1056 of the beamformer 1054 does not sound muffled. An Infinite Impulse Response (IIR) or Finite Impulse Response (FIR) filter with a 2800-3500 Hz cut-off frequency for an 8 KHz sampling rate $f_s$ may be used for low-pass filtering the calibrated refined noise reference signal 1052. The cut-off frequency may be doubled if the sampling rate $f_s$ is doubled.

The calibrated refined noise reference signal 1052 may be designated $z_{nf}$(n). The LPF 1080 may be designated $h_{LPF}$(n). The low-pass filtered, calibrated, refined noise reference signal 1082 may be designated $z_j$(n). The output 1086 of the adaptive filter 1084 may be designated $z_{w2}$(n). The adaptive filter weights may be designated $w_2$(i), and may be updated using any adaptive filtering technique known in the art (e.g., LMS, NLMS, etc.). The desired audio reference signal 1016 may be designated $z_{b1}$(n). The second desired audio signal 1056 may be designated $z_{sf}$(n). The beamformer 1054 may be configured to implement a beamforming process as expressed in equations (61), (62), and (63):

$$z_j(n)=z_{nf}(n)*h_{LPF}(n) \quad (61)$$

$$z_{w2}(n)=\sum_{i=0}^{M-1} w_2(i)z_j(n-i) \quad (62)$$

$$z_{sf}(n)=z_{b1}(n)-z_{w2}(n) \quad (63)$$

Although not shown in FIG. 10, the calibrated, refined noise reference signal 1052, the low-pass filtered, calibrated, refined noise reference signal 1082, and/or the output 1086 of the adaptive filter 1084 may also be passed through to a post processing block (e.g., the post-processing block 760).

Figure 11:
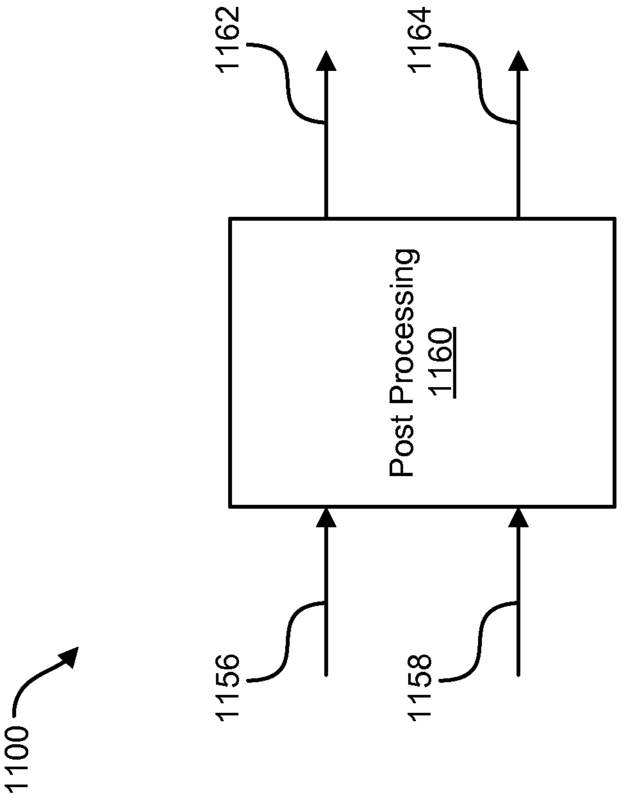
FIG. 11 is a block diagram illustrating some aspects of one possible configuration of a post-processing block.

FIG. 11 is a block diagram illustrating some aspects of one possible configuration of a post-processing block 1160. Post-processing techniques may be used for removing additional residual noise from the second desired audio signal 1156. Post-processing methods such as spectral subtraction, Wiener filtering, etc. may be used for suppressing further noise from the second desired audio signal 1156. The desired audio output signal 1162 may be transmitted, output through a speaker, or otherwise utilized. Any stage of the noise reference processed signal 1158 may also be utilized or provided as output 1164.

Figure 12:
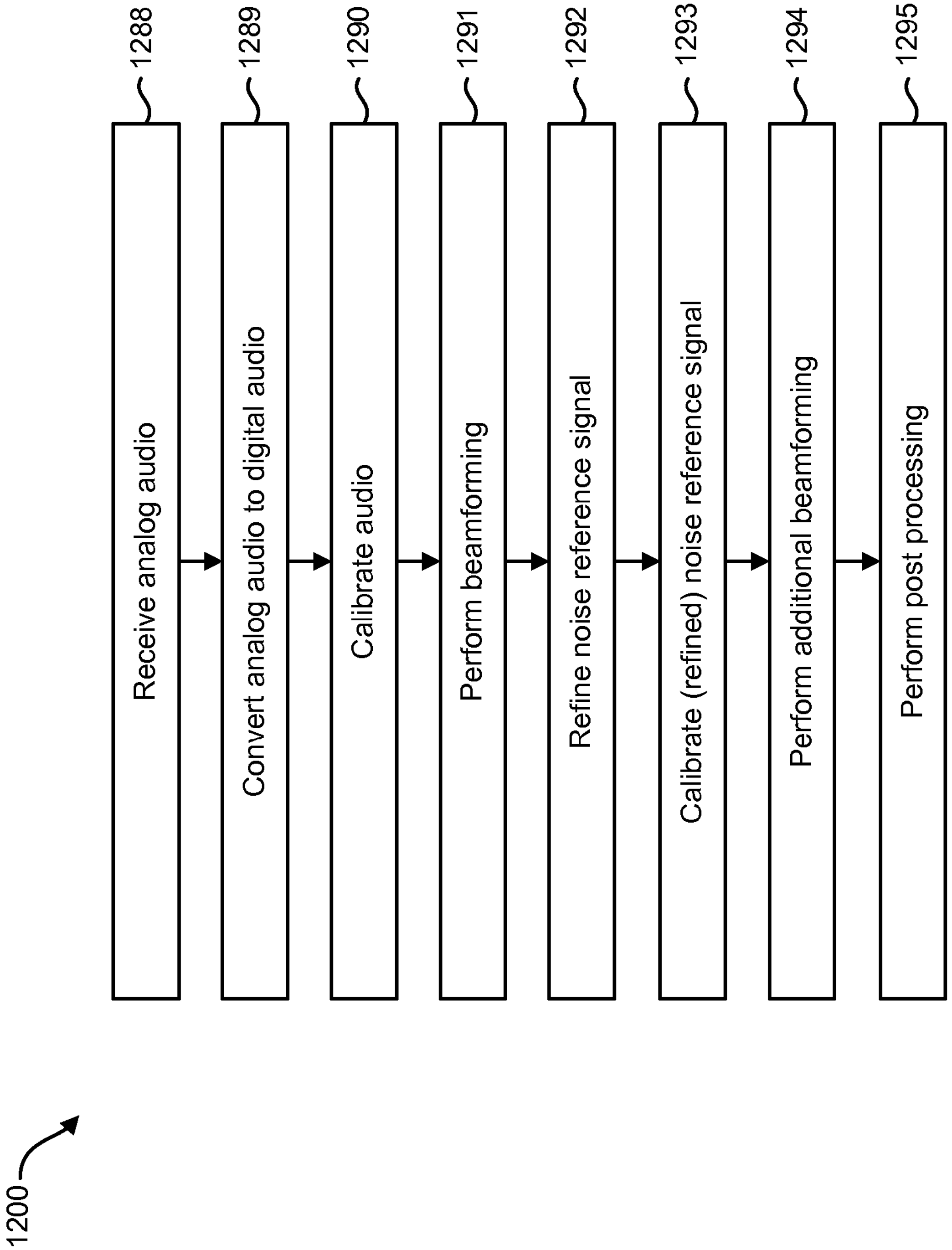
FIG. 12 is a flow diagram illustrating a method for suppressing ambient noise.

FIG. 12 is a flow diagram illustrating some aspects of one possible configuration of a method 1200 for suppressing ambient noise. The method 1200 may be implemented by a communication device, such as a mobile phone, "land line" phone, wired headset, wireless headset, hearing aid, audio/video recording device, etc.

Desired audio signals (which may include speech 106) as well as ambient noise (e.g., the ambient noise 108) may be received 1288 via multiple transducers (e.g., microphones 110*a*, 110*b*). These transducers may be closely spaced on the communication device. These analog audio signals may be converted 1289 to digital audio signals (e.g., digital audio signals 746*a*, 746*b*).

The digital audio signals may be calibrated 1290, such that the desired audio energy is balanced between the signals.

Beamforming may then be performed 1291 on the signals, which may produce at least one desired audio reference signal (e.g., desired audio reference signal 716) and at least one noise reference signal (e.g., noise reference signal 718). The noise reference signal(s) may be refined 1292 by removing more desired audio from the noise reference signal(s). The noise reference signal(s) may then be calibrated 1293, such that the energy of the noise in the noise reference signal(s) is balanced with the noise in the desired audio reference signal(s). Additional beamforming may be performed 1294 to remove additional noise from the desired audio reference signal. Post processing may also be performed 1295.

Figure 12A:
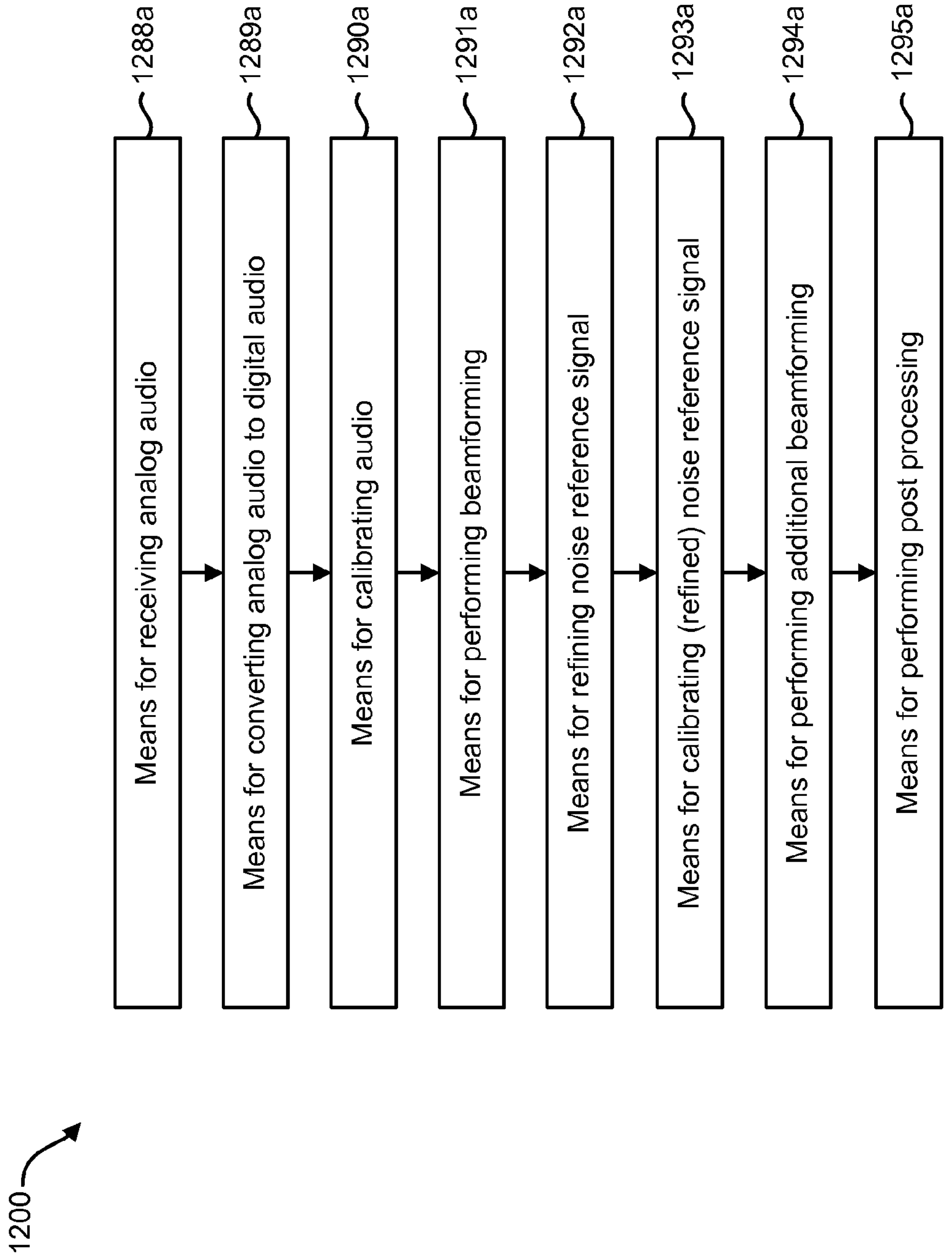
FIG. 12*a* illustrates means-plus-function blocks corresponding to the method of FIG. 12.

The method 1200 described in FIG. 12 above may be performed by various hardware and/or software component(s) and/or module(s) corresponding to the means-plus-function blocks 1200*a* illustrated in FIG. 12*a*. In other words, blocks 1288 through 1295 illustrated in FIG. 12 correspond to means-plus-function blocks 1288*a* through 1295*a* illustrated in FIG. 12*a*.

Figure 13:
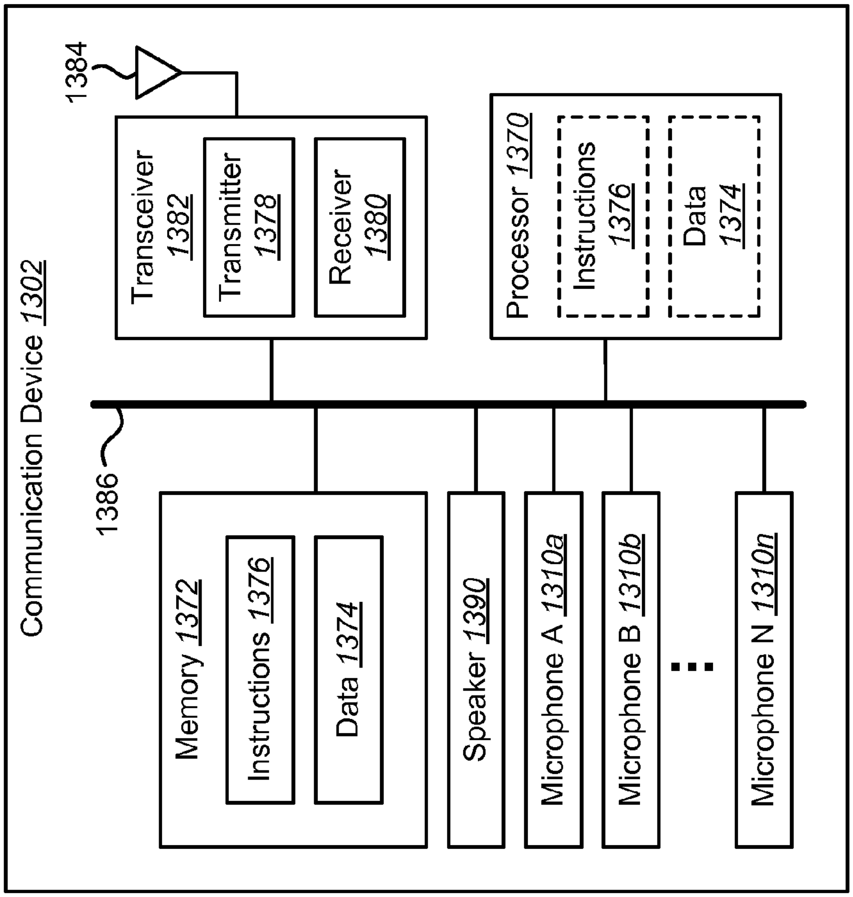
FIG. 13 is a block diagram illustrating various components that may be utilized in a communication device that may be used to implement the methods described herein.

Reference is now made to FIG. 13. FIG. 13 illustrates certain components that may be included within a communication device 1302. The communication device 1302 may be configured to implement the methods for suppressing ambient noise described herein.

The communication device 1302 includes a processor 1370. The processor 1370 may be a general purpose single- or multi-chip microprocessor (e.g., an ARM), a special purpose microprocessor (e.g., a digital signal processor (DSP)), a microcontroller, a programmable gate array, etc. The processor 1370 may be referred to as a central processing unit (CPU). Although just a single processor 1370 is shown in the communication device 1302 of FIG. 13, in an alternative configuration, a combination of processors (e.g., an ARM and DSP) could be used.

The communication device 1302 also includes memory 1372. The memory 1372 may be any electronic component capable of storing electronic information. The memory 1372 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1374 and instructions 1376 may be stored in the memory 1372. The instructions 1376 may be executable by the processor 1370 to implement the methods disclosed herein. Executing the instructions 1376 may involve the use of the data 1374 that is stored in the memory 1372.

The communication device 1302 may also include multiple microphones 1310*a*, 1310*b*, 1310*n*. The microphones 1310*a*, 1310*b*, 1310*n* may receive audio signals that include speech and ambient noise, as discussed above. The communication device 1302 may also include a speaker 1390 for outputting audio signals.

The communication device 1302 may also include a transmitter 1378 and a receiver 1380 to allow wireless transmission and reception of signals between the communication device 1302 and a remote location. The transmitter 1378 and receiver 1380 may be collectively referred to as a transceiver 1382. An antenna 1384 may be electrically coupled to the transceiver 1382. The communication device 1302 may also include (not shown) multiple transmitters, multiple receivers, multiple transceivers and/or multiple antenna.

The various components of the communication device 1302 may be coupled together by one or more buses, which may include a power bus, a control signal bus, a status signal bus, a data bus, etc. For the sake of clarity, the various buses are illustrated in FIG. 13 as a bus system 1386.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements. The terms "instructions" and "code" may be used interchangeably herein.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 6 and 12, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for generating reference signals using multiple audio signals, comprising:
- providing at least two audio signals by at least two electro-acoustic transducers, wherein the at least two audio signals comprise desired audio and ambient noise;
- performing beamforming on the at least two audio signals in order to obtain a desired audio reference signal that is separate from a noise reference signal; and
- performing additional beamforming, with a second beamformer, based on a noise reference signal, to remove additional noise from the desired audio reference signal.

2. The method of claim 1, wherein the residual desired audio is high-frequency residual desired audio.

3. The method of claim 1, wherein the method is implemented by a communication device, and wherein the desired audio comprises speech.

4. The method of claim 1, wherein the at least two electro-acoustic transducers are microphones.

5. The method of claim 1, further comprising calibrating the at least two signals in order to balance desired audio energy between the at least two signals.

6. The method of claim 1, further comprising calibrating the refined noise reference signal to compensate for attenuation effects caused by the beamforming.

7. The method of claim 6, wherein calibrating the refined noise reference signal comprises:
- filtering the refined noise reference signal in order to obtain at least two sub-bands;
- calculating calibration factors, a separate calibration factor being calculated for each sub-band;
- calibrating the sub-bands by multiplying the sub-bands by the calibration factors; and
- summing the calibrated sub-bands.

8. The method of claim 1, wherein the beamforming comprises fixed beamforming.

9. The method of claim 1, wherein the beamforming comprises adaptive beamforming.

10. The method of claim 1 wherein performing additional beamforming comprises:
- low-pass filtering a calibrated, refined noise reference signal; and
- performing adaptive filtering on the low-pass filtered, calibrated, refined noise reference signal.

11. The method of claim 1, wherein the noise reference signal is refined by removing residual desired audio from the noise reference signal, thereby obtaining a refined noise reference signal.

12. An apparatus for generating reference signals using multiple audio signals, comprising:
- at least two electro-acoustic transducers that provide at least two audio signals comprising desired audio and ambient noise;
- a beamformer that is capable of performing beamforming on the at least two audio signals in order to obtain a desired audio reference signal that is separate from a noise reference signal; and
- a second beamformer that is capable of performing additional beamforming, with a second beamformer, based on a noise reference signal, to remove additional noise from the desired audio reference signal.

13. The apparatus of claim 12, wherein the residual desired audio is high-frequency residual desired audio.

14. The apparatus of claim 12, wherein the apparatus is a communication device, and wherein the desired audio comprises speech.

15. The apparatus of claim 12, wherein the at least two electro-acoustic transducers are microphones.

16. The apparatus of claim 12, further comprising a calibrator that calibrates the at least two signals in order to balance desired audio energy between the at least two signals.

17. The apparatus of claim 12, further comprising a noise reference calibrator that calibrates the refined noise reference signal to compensate for attenuation effects caused by the beamforming.

18. The apparatus of claim 17, wherein the noise reference calibrator comprises:
- at least two filters that filter the refined noise reference signal in order to obtain at least two sub-bands;
- a calibration unit that calculates calibration factors, a separate calibration factor being calculated for each sub-band;
- at least two multipliers that calibrate the sub-bands by multiplying the sub-bands by the calibration factors; and
- an adder that sums the calibrated sub-bands.

19. The apparatus of claim 12, wherein the beamformer is a fixed beamformer.

20. The apparatus of claim 12, wherein the beamformer is an adaptive beamformer.

21. The apparatus of claim 12, wherein the second beamformer comprises:

a low-pass filter that is capable of performing low-pass filtering on a calibrated, refined noise reference signal; and an adaptive filter that is capable of performing adaptive filtering on the low-pass filtered, calibrated, refined noise reference signal.

22. The apparatus of claim 12, further comprising a noise reference refiner that is capable of refining the noise reference signal by removing residual desired audio from the noise reference signal, thereby obtaining a refined noise reference signal.

23. An apparatus for generating reference signals using multiple audio signals, comprising:

means for providing at least two audio signals by at least two electro-acoustic transducers, wherein the at least two audio signals comprise desired audio and ambient noise;

means for performing beamforming on the at least two audio signals in order to obtain a desired audio reference signal that is separate from a noise reference signal; and means for performing additional beamforming, with a second beamformer, based on a noise reference signal, to remove additional noise from the desired audio reference signal.

24. The apparatus of claim 23, wherein the residual desired audio is high-frequency residual desired audio.

25. The apparatus of claim 23, further comprising means for calibrating the at least two signals in order to balance desired audio energy between the at least two signals.

26. The apparatus of claim 23, further comprising means for calibrating the refined noise reference signal to compensate for attenuation effects caused by the beamforming.

27. The apparatus of claim 26, wherein the means for calibrating the refined noise reference signal comprises:

means for filtering the refined noise reference signal in order to obtain at least two sub-bands;

means for calculating calibration factors, a separate calibration factor being calculated for each sub-band;

means for calibrating the sub-bands by multiplying the sub-bands by the calibration factors; and means for summing the calibrated sub-bands.

28. The apparatus of claim 23, wherein, the means for performing additional beamforming comprises:

means for low-pass filtering a calibrated, refined noise reference signal, thereby obtaining a low-pass filtered, calibrated, refined noise reference signal; and means for performing adaptive filtering on the low-pass filtered, calibrated, refined noise reference signal.

29. The apparatus of claim 23, further comprising means for refining the noise reference signal by removing residual desired audio from the noise reference signal, thereby obtaining a refined noise reference signal.

30. A computer-program product for generating reference signals using multiple audio signals, the computer-program product comprising a non-transitory, computer-readable medium having instructions thereon, the instructions comprising:

code for providing at least two audio signals by at least two electro-acoustic transducers, wherein the at least two audio signals comprise desired audio and ambient noise;

code for performing beamforming on the at least two audio signals in order to obtain a desired audio reference signal that is separate from a noise reference signal; and code for performing additional beamforming, with a second beamformer, based on a noise reference signal, to remove additional noise from the desired audio reference signal.

31. The computer-program product of claim 30, wherein the residual desired audio is high-frequency residual desired audio.

32. The computer-program product of claim 30, further comprising code for calibrating the at least two signals in order to balance desired audio energy between the at least two signals.

33. The computer-program product of claim 30, further comprising code for calibrating the refined noise reference signal to compensate for attenuation effects caused by the beamforming.

34. The computer-program product of claim 33, wherein the code for calibrating the refined noise reference signal comprises:

code for filtering the refined noise reference signal in order to obtain at least two sub-bands;

code for calculating calibration factors, a separate calibration factor being calculated for each sub-band;

code for calibrating the sub-bands by multiplying the sub-bands by the calibration factors; and code for summing the calibrated sub-bands.

35. The computer-program product of claim 30, wherein the code for performing additional beamforming comprises:

code for low-pass filtering a calibrated, refined noise reference signal, thereby obtaining a low-pass filtered, calibrated, refined noise reference signal; and code for performing adaptive filtering on the low-pass filtered, calibrated, refined noise reference signal.

36. The computer-program product of claim 30, further comprising code for refining the noise reference signal by removing residual desired audio from the noise reference signal, thereby obtaining a refined noise reference signal.

* * * * *